(12) United States Patent  (10) Patent No.: US 7,779,442 B1
Fukuzawa et al.  (45) Date of Patent: Aug. 17, 2010

(54) INFORMATION DISTRIBUTION SYSTEM

(75) Inventors: Keiji Fukuzawa, Chiba (JP);
Masakatsu Toyoshima, Kanagawa (JP);
Katsumi Ohishi, Tokyo (JP); Kenji Inose, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/623,780

(22) PCT Filed: Sep. 30, 1999

(86) PCT No.: PCT/JP99/05400
§ 371 (c)(1),
(2), (4) Date: Sep. 8, 2000

(87) PCT Pub. No.: WO00/42724
PCT Pub. Date: Jul. 20, 2000

(30) Foreign Application Priority Data
Jan. 12, 1999 (JP) ................... 11-005729
Jan. 12, 1999 (JP) ................... 11-005731

(51) Int. Cl.
*G06F 3/00* (2006.01)
*G06F 13/00* (2006.01)
*H04N 5/445* (2006.01)

(52) U.S. Cl. ................................... 725/50

(58) Field of Classification Search ............ 725/71, 725/67, 63, 144, 146, 82, 114, 116; 710/53
See application file for complete search history.

(56) References Cited

U.S. PATENT DOCUMENTS 5,093,718 A 3/1992 Hoarty et al.
5,418,559 A 5/1995 Blahut (Continued)

FOREIGN PATENT DOCUMENTS

EP 211385 A2 * 2/1987

(Continued)

OTHER PUBLICATIONS

DVB document A038, "Specification for Service Information in Digital Video Broadcasting Systems", published in Mar. 1998.*

(Continued)

*Primary Examiner*—Christopher Kelley
*Assistant Examiner*—Usha Raman
(74) *Attorney, Agent, or Firm*—Frommer Lawrence & Haug LLP; William S. Frommer; Thomas F. Presson

(57) ABSTRACT

This invention relates to an information delivery system and method, an information transmission apparatus and method, and an information receiving apparatus and method for delivering a digital multi-channel service signal through a satellite and a cable network. A QPSK demodulation circuit demodulates an inputted TS and outputs it to an error correction circuit. The error correction circuit corrects the inputted signal and outputs it to a network information (NIT) conversion circuit. The NIT conversion circuit replaces the NIT for CS waves with NIT for cable TV and outputs it to a QAM demodulation circuit. The QAM demodulation circuit demodulates the inputted signal and pouts it to a frequency conversion circuit. The frequency conversion circuit converts the frequency of the inputted signal into a predetermined value and outputs the signal to a signal mixer.

8 Claims, 31 Drawing Sheets

U.S. PATENT DOCUMENTS

| | | | |
|---|---|---|---|
| 5,559,549 | A | 9/1996 | Hendricks et al. |
| 5,917,830 | A * | 6/1999 | Chen et al. .................. 370/487 |
| 5,970,386 | A * | 10/1999 | Williams ..................... 725/69 |
| 6,038,433 | A * | 3/2000 | Vegt ......................... 455/161.1 |
| 6,480,551 | B1 * | 11/2002 | Ohishi et al. ............... 375/260 |
| 6,687,308 | B1 * | 2/2004 | Inose et al. ................ 375/260 |
| 6,779,195 | B2 * | 8/2004 | Oishi et al. ................. 725/68 |
| 7,051,355 | B1 * | 5/2006 | Inose et al. .................. 725/71 |
| 7,478,415 | B1 * | 1/2009 | Takeuchi .................... 725/42 |
| 2003/0133051 | A1 * | 7/2003 | Oishi et al. ................. 348/735 |
| 2005/0015804 | A1 * | 1/2005 | LaJoie et al. ................. 725/44 |

FOREIGN PATENT DOCUMENTS

| | | |
|---|---|---|
| EP | 0 822 718 | 2/1998 |
| EP | 917370 A2 * | 5/1999 |
| EP | 1071286 A1 * | 1/2001 |
| JP | 8 506938 | 7/1996 |
| JP | 8 228156 | 9/1996 |
| JP | 9 500771 | 1/1997 |
| JP | 9 65316 | 3/1997 |
| JP | 9 102943 | 4/1997 |
| JP | 9 505433 | 5/1997 |
| JP | 9 191453 | 7/1997 |
| JP | 9 233459 | 9/1997 |
| JP | 9 275551 | 10/1997 |
| JP | 9 510327 | 10/1997 |
| JP | 10 79931 | 3/1998 |
| JP | 10 509568 | 9/1998 |
| JP | 11355766 A * | 12/1999 |
| JP | 2000209279 A * | 7/2000 |
| JP | 2000209280 A * | 7/2000 |
| JP | 2007306627 A * | 11/2007 |
| JP | 2008236778 A * | 10/2008 |
| WO | WO 95 15058 | 6/1995 |
| WO | WO 0042767 A1 * | 7/2000 |

OTHER PUBLICATIONS

DVB Document A038: Specification for service information (SI) in Digital Video Broadcasting (DVB) Systems, DVB Project Office, Mar. 1998.*

ETS 300 468, "Digital Video Broadcasting (DVB); Specification for Service Information (SI) in DVB systems", Second Edition published in 1997.*

"ETR 211: Digital Video Broadcasting; Guidelines on implementation and usage of Service Information (SI)" ETSI Technical Report, XX, XX, pp. 1-42 XP002131839.

Sesena J et al: "Satellite Digital TV Reception Through Domestic TV Networks (SMATV)," International Broadcasting Convention, London, GB, pp. 517-523 XP000602444.

Sesena J: "The DVB Satellite, Cable and SMATV Systems. Why the Technical Choices Were Made," EBU Review-Technical European Broadcasting Union. Brussels, BE, NR. 266, pp. 24-38 XP000559447 ISSN: 0251-0936.

"Digital Broadcasting Systems for Television; Implementation Guidelines for the Use of MPEG-2 Systems; Guidelines on Implementation and Usage of Service Information".

"Digital Video Broadcasting (DVB); Specification for Service Information (SI) in DVB Systems" ETSI EN 300 468 V1.3.1 (Feb. 1998), pp. 1-74.

"Digitale Sat-Aufbereitung" Funkschau, 'Online! —1998 pp. 45-49, XP002185756 Retrieved from the Internet: <URL:http://www.funkschau-hande.de/heftarchiv/pdf/1998/fs12/fs9812045.pdf> 'retrieved on Dec. 14, 2001 and partial computer-generated English translation.

* cited by examiner

INFORMATION DISTRIBUTION SYSTEM

TECHNICAL FIELD

The present invention relates to an information delivery system and an information delivery method, an information transmission apparatus, and an information transmission method, an information receiving apparatus and an information receiving method, and media used for delivering a digital multi-channel service signal through a satellite channel and a cable network.

BACKGROUND ART

Recently, so-called cable televisions are spreading widely as multi-channel media in areas other than remote areas and blind spots. FIG. 1 shows an example of a cable television receiver. A data receiving section 1 extracts a receiver control signal from a cable television signal transmitted from a cable television station, and supplies it to a host processor 2. The host processor 2 controls the entire receiver, based on a control signal and a tuning operation by an audience. A receiving tuner 3 extracts the signal of a program selected by the tuning operation of the audience from the cable television signal, and outputs it to a descrambler 4. The descrambler 4 uses a synchronization signal supplied from an AM wave detecting circuit 7, to release the scramble of the program signal, and outputs this signal to a video wave detecting circuit 5 and the AM wave detecting circuit 7. The video wave detecting circuit 5 extracts a video signal from the program signal and demodulates it. Further the circuit 5 outputs the other components of the program signal to a FM wave detecting circuit 6. The FM wave detecting circuit 6 demodulates an audio signal.

As described above, in case of the cable television, information (video signal, audio signal, and control signal) is transmitted as an analogue signal. Therefore, processing for compressing and multi-layering information cannot be performed. Consequently, the number of channels (programs) that can be provided by a cable television is limited to about 60.

At present, in the digital multi-channel satellite broadcasting (e.g., PerfecTV (trademark)) which is spreading widely, 100 or more channels have been realized. The market needs further multiplication of channels in the cable television.

To realize further multiplication of channels in the cable television, the following way may be considered. That is, videos can be multi-layered by compression if all signals are digitized in cable television stations. However, this is difficult to realize when considering the costs of equipments and running costs for the cable television stations. Hence, consideration is taken into a method of further multiplying channels in the cable television by redeliver digital multi-channel satellite broadcasting such as PerfecTV.

The digital multi-channel satellite broadcasting system will now be explained with reference to FIG. 2. The transmission section 11 of a satellite service provider 10 performs scrambling on MPEG-compressed program information supplied from a program provider, and multi-layers it together with service information such as electronic program guide information (EPG: Electric Program Guide), audience management information, and the like. The transmission section 11 further transmits them as a CS of a linear polarized wave to a communication satellite 20. This CS wave is transmitted to a receiving terminal apparatus 30 through the communication satellite 20, and is received by a receiver 32 through a CS antenna 31. The receiver 32 extracts predetermined program information from the CS wave and outputs it to a television receiver 33. An audience management section 12 issues an IC card 34 to an audience. A key management section 13 of the audience management section 12 manages audible programs corresponding to the IC card 34. An audience information processing section 14 calculates an audience fee, based on audience information notified by the receiver 32, and notifies a customer management section 15 of it. The customer management section 15 charges the audience fee to the audience.

FIG. 3 shows a specific structure of the receiver 32. A receiving tuner 92 of a satellite front end section 91 extracts a transport stream (TS) including a predetermined program, from a CS wave, and output it to a QPSK demodulation circuit 93. The QPSK demodulation circuit 93 QPSK-demodulates the inputted TS and outputs it to an error correction circuit 94. The error correction circuit 94 corrects error information of the inputted TS and outputs it to a transport section 55. A descrambler 56 of the transport section 55 descrambles the TS which has been scrambled, with use of descrambling information recorded in an IC-card 34 which the satellite broadcasting service provider 10 issued. The descrambler 56 further outputs it to a demultiplexer 57.

The demultiplexer 57 extracts information of a predetermined program, based on multi-layered program specific information (PSI), and provides it to an MPEG decoding section 58. The MPEG decoding section 58 MPEG-expands an inputted program to generate a video signal and an audio signal, and outputs them to a television receiver 33.

A host processor 59 controls the entire receiver 32 in response to an operation by an audience, and records information (program audience information) of a received pay program on the IC card 34. The host processor 59 also reads descramble information recorded on the IC card 34 and supplies it to the descrambler 56. Further, the host processor 59 controls the communication section 61 to notify periodically an audience information processing section 14 of program audience information recorded on the IC card 34. The audience information processing section 14 calculates an audience fee, based on the inputted audience information, and notifies the customer management section 15 of it.

To provide digital multi-channel satellite broadcasting signals to the cable television network, however, the cable television station needs processing, e.g., receiving a digital multi-channel satellite broadcasting signal, separating a multi-layered signal, and multi-layering again the signal. The equipments thereof require enormous costs.

To provided digital multi-channel services in a plurality of cable networks, each cable network needs an apparatus for digitizing a plurality of programs, and an equipment for managing customers, which require enormous equipment investment and management costs.

Further, the method for providing services, such as CS digital services, BS digital services, and ground digital services, differs depending on media. Therefore, transmission, methods must be unified between the cable networks each other, to receive them by one common receiver.

In addition, in a method of reconstructing and transmitting a service from a satellite in a cable network, it is impossible to receive services such as EPG services and download services, which are unique to digital services.

Further, in provided digital multi-channel satellite broadcasting, it is difficult for cable television stations to carry out audience information management, if specific charge such as pay-per-view is taken.

In case where a digital multi-channel satellite broadcasting signal is transmitted again to a cable station or a public institution in a modulation conversion method, frequency information and program information at least in network information must be converted into information which matches with contents of retransmission in the cable station or public institution, because of necessity for receiving operations by a receiver.

If retransmission is achieved by only modulation conversion without converting network information, a special function is required, e.g., it is necessary to include a correspondence table by which the frequency information physically transmitted in a receiving system and the frequency information contained in the network information are related to each other.

If a program information part in the network information is not changed, all programs that are served by a satellite system must be re-transmitted to cables.

Also, in case of a transport stream which does not have network information matched with the service in the network as a retransmission target, operation errors may be caused or audience may be confused when the stream is received by in a receiver.

Further, if original network information is not used but network information matched with the network as a retransmission target is generated in a unique manner and rewriting is carried out, it is difficult to match the data length of the network information with the original data length, so the structure of the apparatus is complicated.

DISCLOSURE OF THE INVENTION

The present invention has been made in view of this situation and has an object of enabling delivery of a program, which is broadcasted on digital satellite broadcasting, to a cable TV network at low costs.

An information delivery system according to the present invention is characterized by comprising: a center station for delivering a digital multi-channel service signal through a first transmission path; a plurality of network stations for receiving the digital multi-channel service signal delivered from the center station, by receiving means, for converting the digital multi-channel service signal received by the receiving means into a digital multi-channel service signal for a second transmission path, by modulation conversion means, and for transmitting the digital multi-channel service signal converted; and a plurality of receiving terminal device for receiving the digital multi-channel service signal delivered from the network stations.

An information delivery method according to the present invention is characterized in that when a digital multi-channel service signal is delivered through a first transmission path from a center station to a plurality of network stations, the digital multi-channel service signal delivered from the center station is converted into a digital multi-channel service signal for a second transmission path is delivered through the second transmission path to a receiving terminal device.

According to the present invention, an information transmission apparatus for transmitting information through a first transmission path is characterized by comprising: receiving means for receiving a broadcasting signal from a second transmission path; demodulation means for demodulating the signal received by the receiving means; and modulation means for modulating the signal demodulated by the demodulation means.

According to the present invention, an information transmission method for transmitting information through a first transmission path is characterized by comprising: a receiving step of receiving a broadcasting signal from a second transmission path; a demodulation step of demodulating the signal received in the receiving step; and a modulation step of modulating the signal demodulated by the demodulation step.

According to the present invention, an information receiving apparatus for receiving information transmitted through a first transmission path, in a network station, and for receiving information retransmitted through a second transmission path from the network station is characterized by comprising: extraction means for extracting a predetermined signal from an inputted signal; demodulation means for demodulating the signal extracted by the extraction means; recording means for recording audience information of a user; and notification means for notifying the audience information recorded by the recording means, to a second provider who provides services with use of the second transmission path, through a first provider who provides services through the first transmission path.

According to the present invention, an information receiving method for receiving information transmitted through a first transmission path, in a network station, and for receiving information retransmitted through a second transmission path from the network station is characterized by comprising: an extraction step of extracting a predetermined signal from an inputted signal; a demodulation step of demodulating the signal extracted in the extraction step; a recording step of recording audience information of a user; and a notification step of notifying the audience information recorded in the recording step, to a second provider who provides services with use of the second transmission path, through a first provider who provides services through the first transmission path.

BEST MODE FOR CARRYING OUT THE INVENTION

In the following, embodiments of the present invention will be in details with reference to the drawings.

Figure 1:
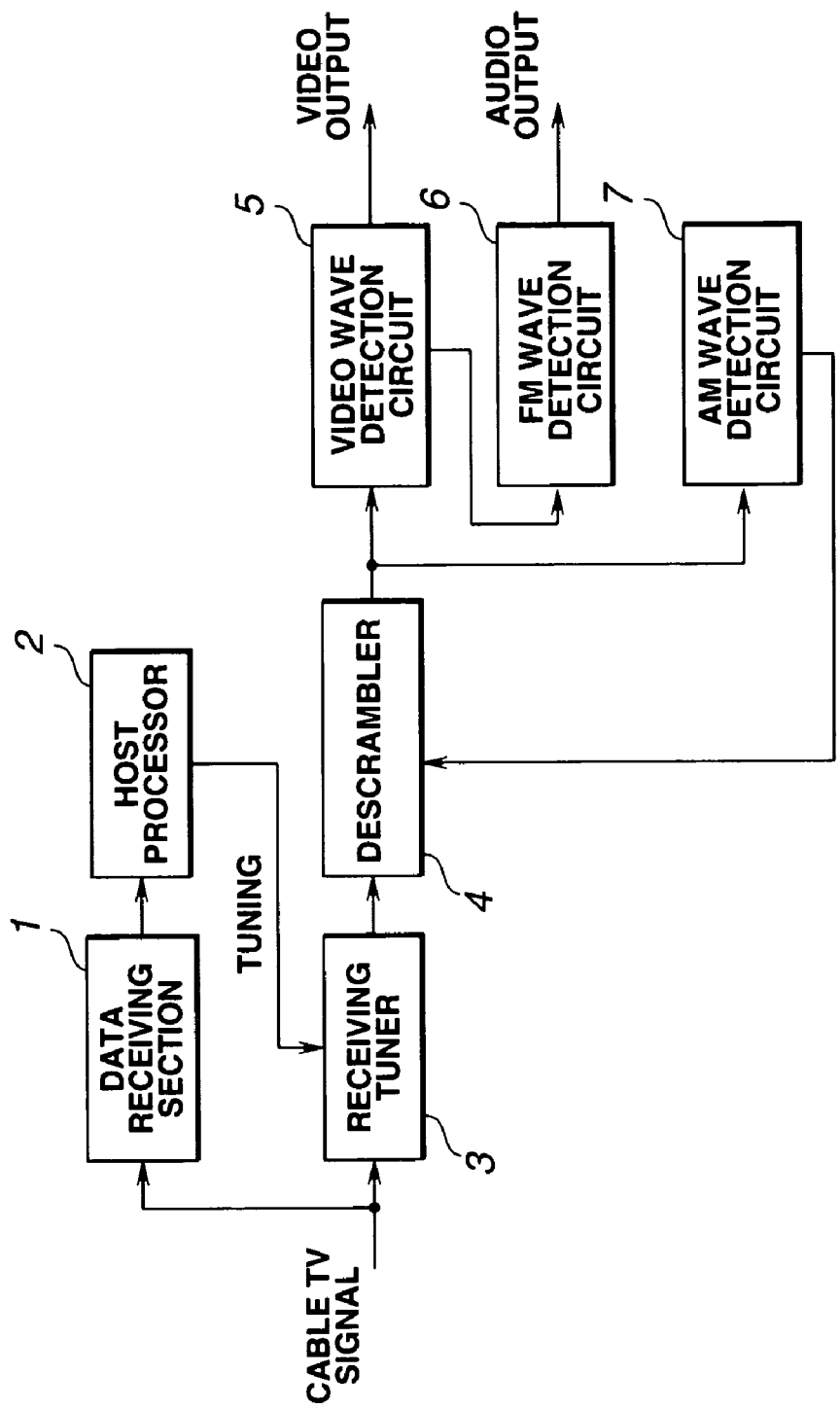
FIG. 1 is a block diagram showing an example of the structure of a conventional cable TV receiver.
Figure 2:
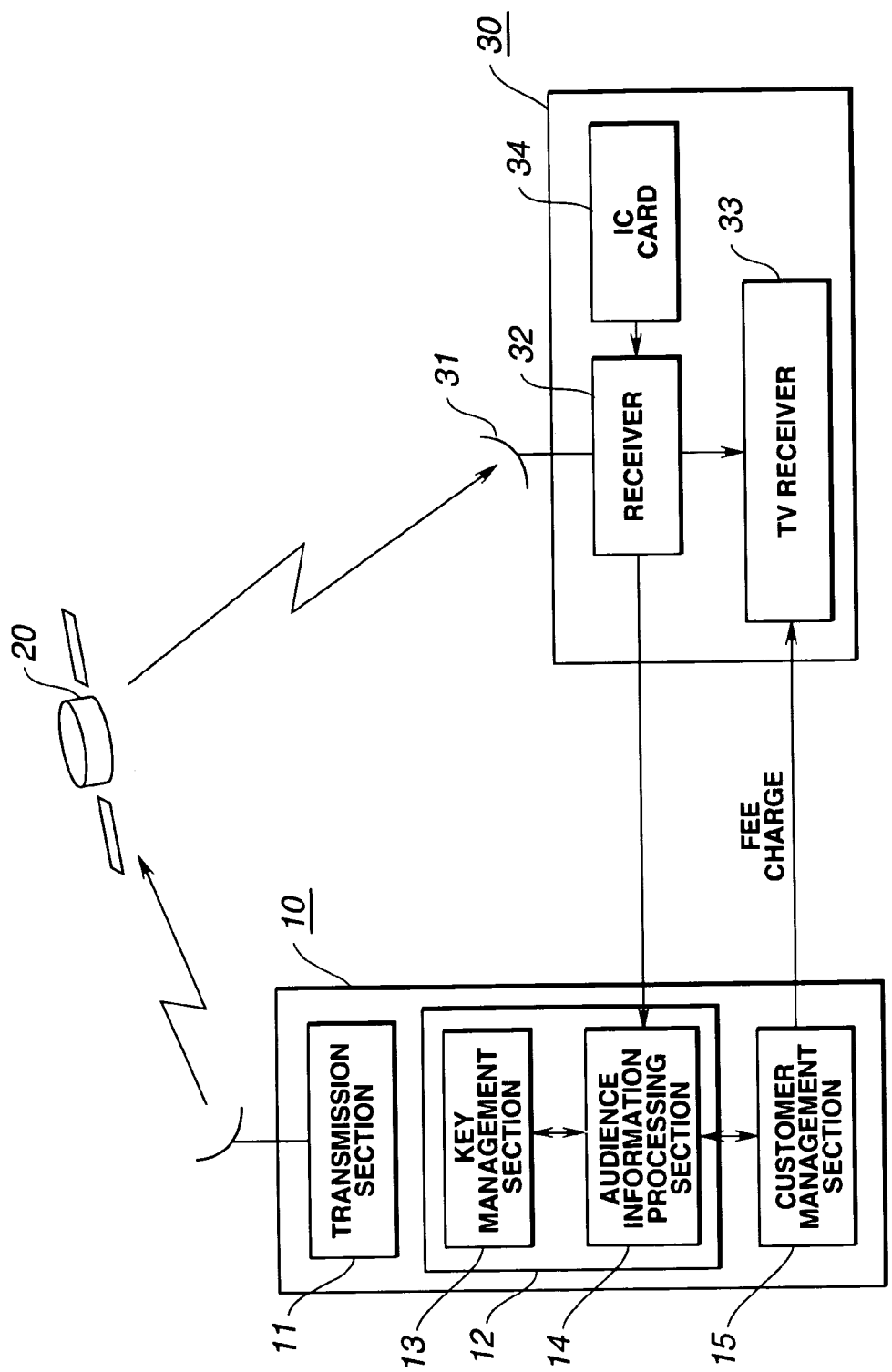
FIG. 2 is a conceptual view showing the structure of a digital multi-channel satellite broadcasting system.
Figure 3:
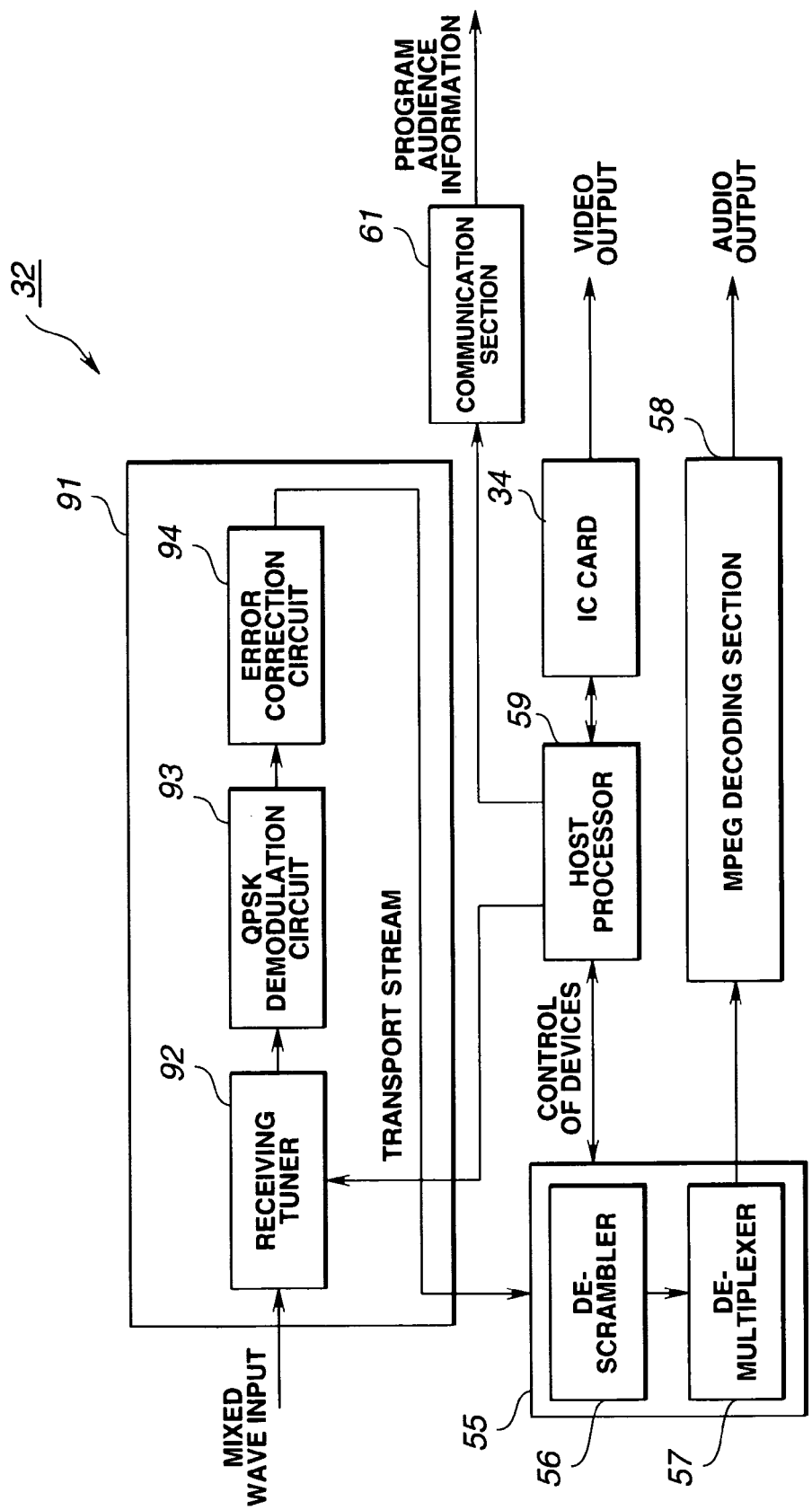
FIG. 3 is a block diagram showing an example of the structure of a receiver in the digital multi-channel satellite broadcasting system.
Figure 4:
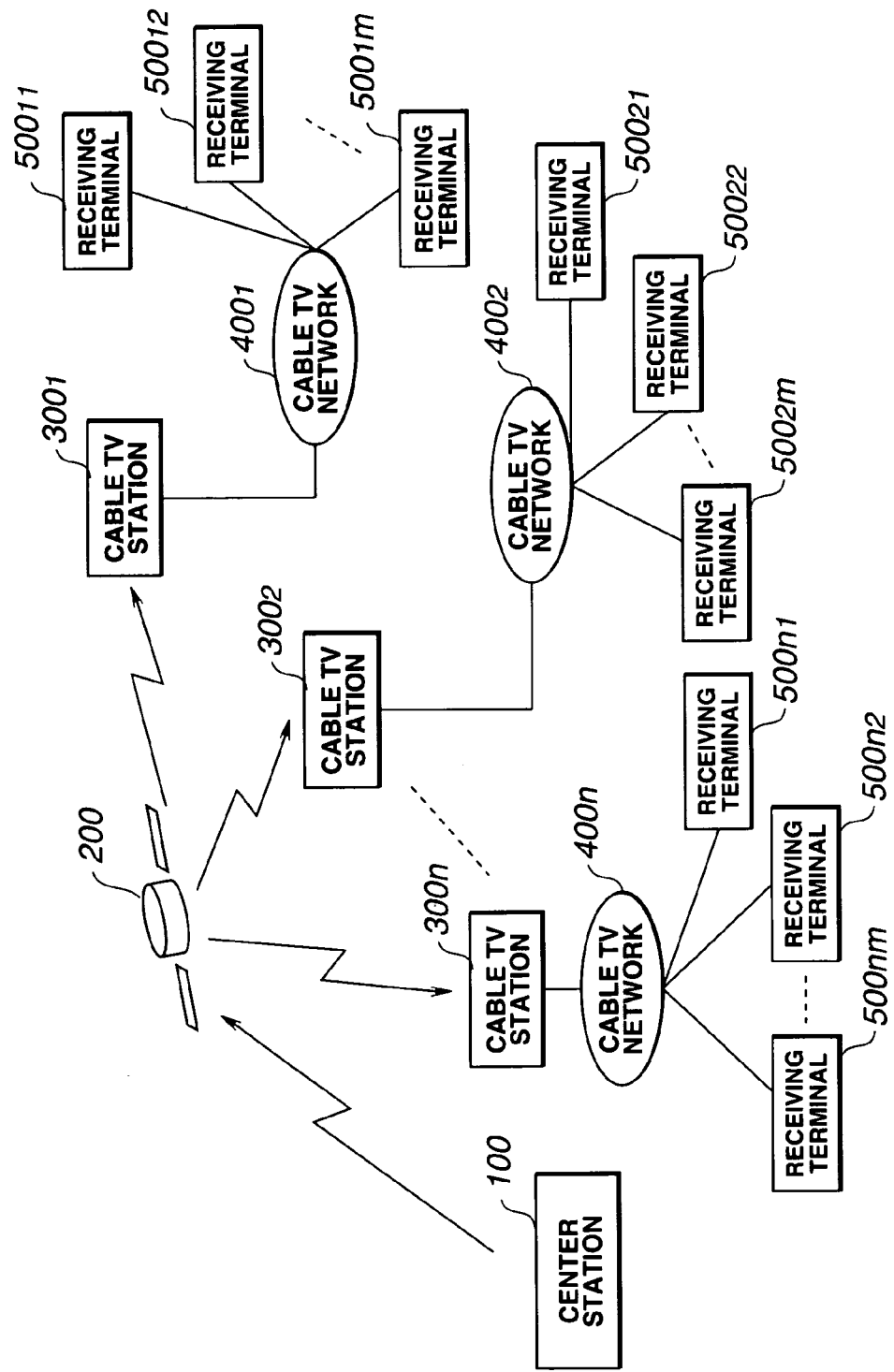
FIG. 4 is a conceptual view showing the structure of a cable transmission system to which the present invention is applied.

The present invention is applied to, for example, an information delivery system having a structure as shown in FIG. 4.

The term of "system" used in the present specification means a total apparatus constructed by a plurality of apparatuses, means, and the like.

This information delivery system is constructed by a center station 100 for transmitting program information and managing customers, a plurality of cable TV stations 3001 to 300$n$ for receiving digital multi-channel satellite broadcasting signals transmitted through a communication satellite 200 from the center station 100 and for transmitting the signals to cable television networks 4001 to 400$n$ of their own, and a plurality of receiving terminal devices 50011 to 500$nm$ respectively connected to the cable television networks 4001 to 400$n$.

The center station 100 comprises a transmission section 111 for transmitting program information, and an audience management section 112 for managing customers. The transmission section 111 scrambles program information which is supplied from a program provider and MPEG-compressed. The section 111 multi-layers the information together with service information such as electronic program guide information (EPG), audience management information, and the like, and transmits them as a CS wave of a linear polarized wave, toward the communication satellite 200. The audience management section 112 issues an IC card 530 to an audience. A key-management section 113 of the audience management section 112 manages programs which can be watched and heard, in correspondence with the IC card 530. Further, an audience information processing section 114 calculates an audience fee, based on the audience information notified by the receiver 510 of the receiver terminal apparatus 500, and notifies the audience fee to the customer management section 350 of the cable TV station 300.

The cable TV station 300 receives the CS wave transmitted from the communication satellite 200 through the CS antenna 310, the wave of TV broadcasting using a ground wave through a ground wave antenna 320, as well as the wave of the satellite broadcasting (hereinafter referred to as a BS wave) transmitted from a broadcasting satellite (not shown) through a BS antenna 330. The cable TV station 300 mixes the inputted CS wave and the analogue broadcasting waves (the ground wave and the BS wave) together by means of a delivery section 340, and delivers the mixed wave to the receiver 510 of the receiver terminal apparatus through the cable television network 400. Also, the customer management section 350 charges the audience for the audience fee, based on the audience fee information from the audience information processing section 114 of the satellite broadcasting service provider 100.

Further, the receiver 510 of the receiver terminal apparatus 500 extracts predetermined program information from the inputted mixed wave, and outputs it to the television receiver 520. The television receiver 520 displays inputted program information.

Figure 6:
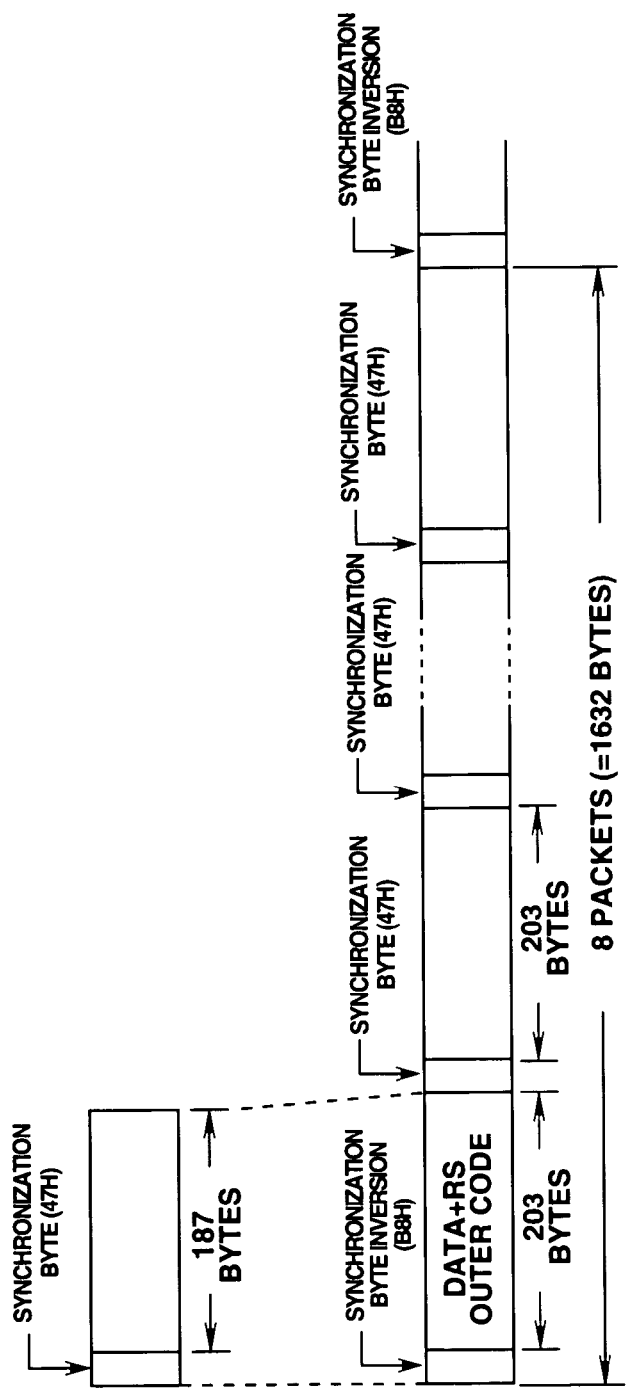
FIGS. 6A and 6B are views showing the frame structures of a MPEG2 transport packet and a DVB system.

The digital multi-channel service signal sent from the communication satellite 200 will now be explained. In the present embodiment, the digital multi-channel service signal is compatible with a DVB (Digital Video Broadcasting) system. FIG. 6B shows a frame structure of digital broadcasting data in the DVB system, in which eight MPEG2 transport packets (cf. FIG. 6A) constitute one frame. In this case, using the synchronization byte (=47H) in the packet, the synchronization byte is inverted once for every eight packets to synchronize frames. Each MPEG2 transport packet (MPEG2 TS packet) is added with an error correction code based on REED SOLOMON (204, 188). Digital broadcasting data shown in FIG. 6B is further subjected to convolution coding (the punctured code rate is defined in the case of DVB: ½, ⅔, ¾, ⅚, ⅞) in the satellite system. The data is thereafter subjected to QPSK (Quadrature Phase Shift Keying) modulation, and is thereafter subjected to frequency conversion into a transmission frequency band. The data is then transmitted through a communication channel from the communication satellite 200.

Figure 7:
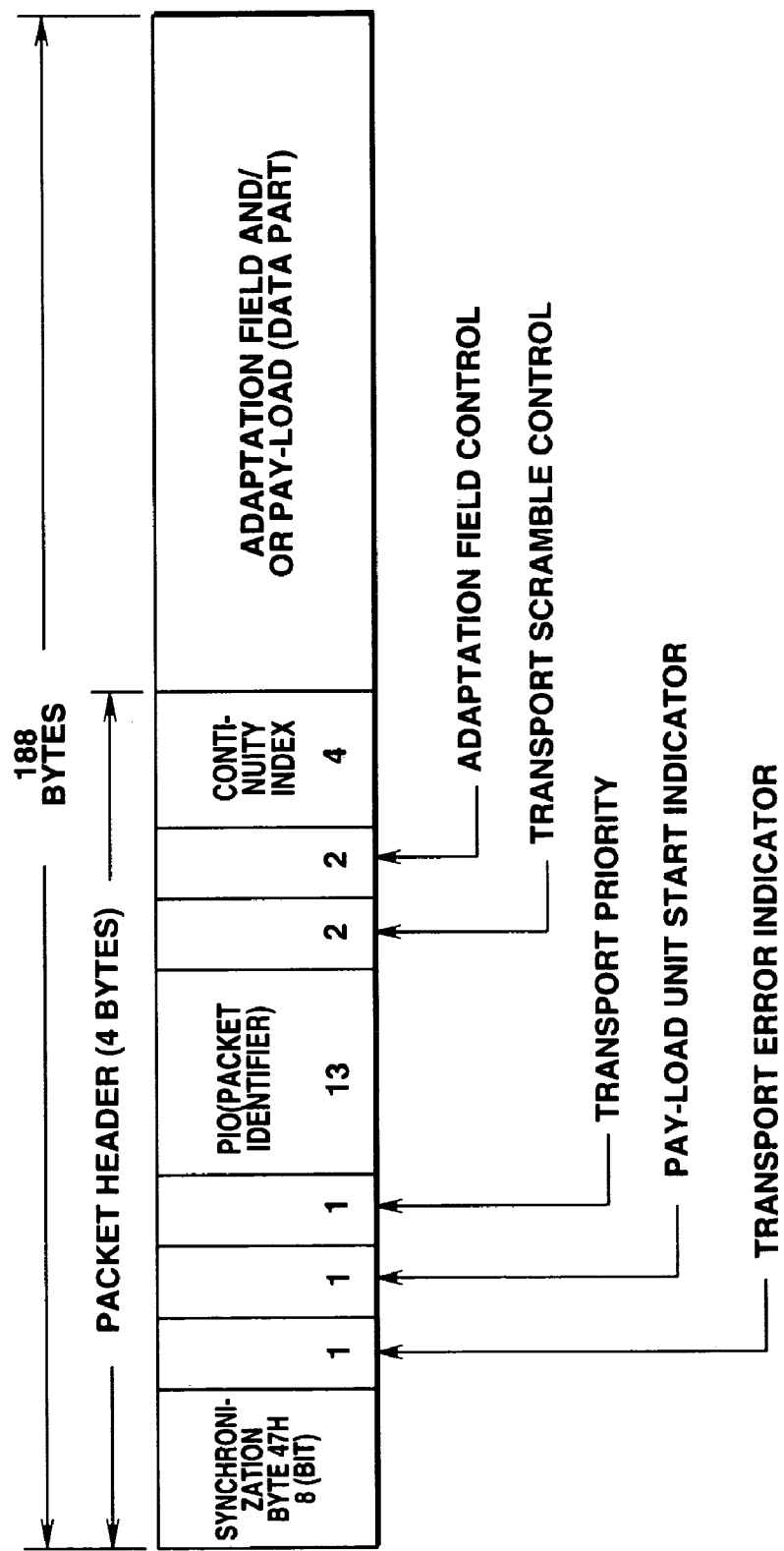
FIG. 7 is a view showing the packet structure of the MPEG 2 transport packet.
Figure 8:
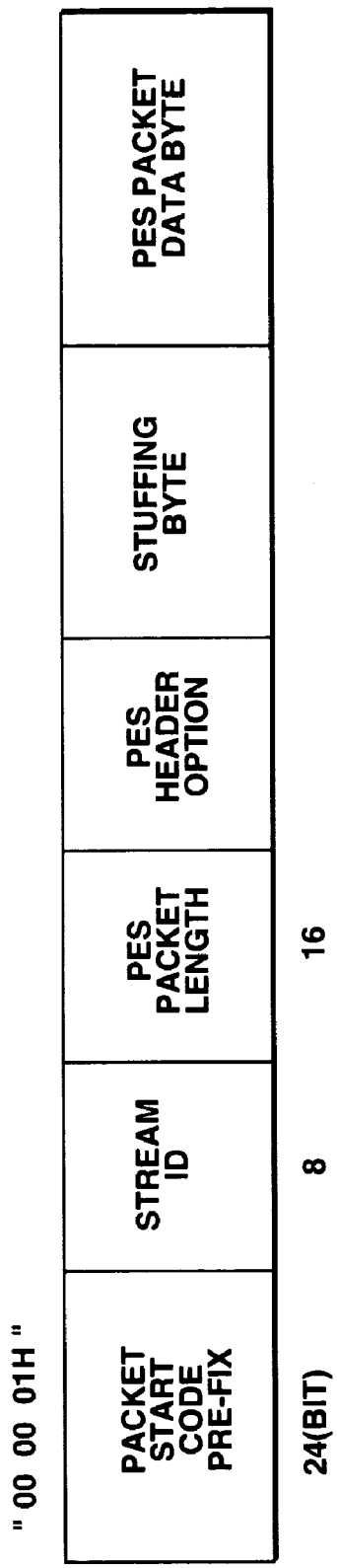
FIG. 8 is a view showing the packet structure of a PES packet.

FIG. 7 shows the packet structure of the MPEG2 transport packet. The top 4 bytes of 188 bytes constitute a packet header. A packet identification (PID) indicating the individual stream of the packet is provided in the packet header. As is well known, a PES (Packetized Elementary Stream) packet whose structure is shown in FIG. 8 is divided and provided in the payload (data part) of the MPEG2 transport packet. Also in the payload, tables such as a program association table (PAT), a program map table (PMT), and a network information table (NIT) are provided in form of sections, as program specific information (PSI) defined in the MPEG2 system.

Figure 9:
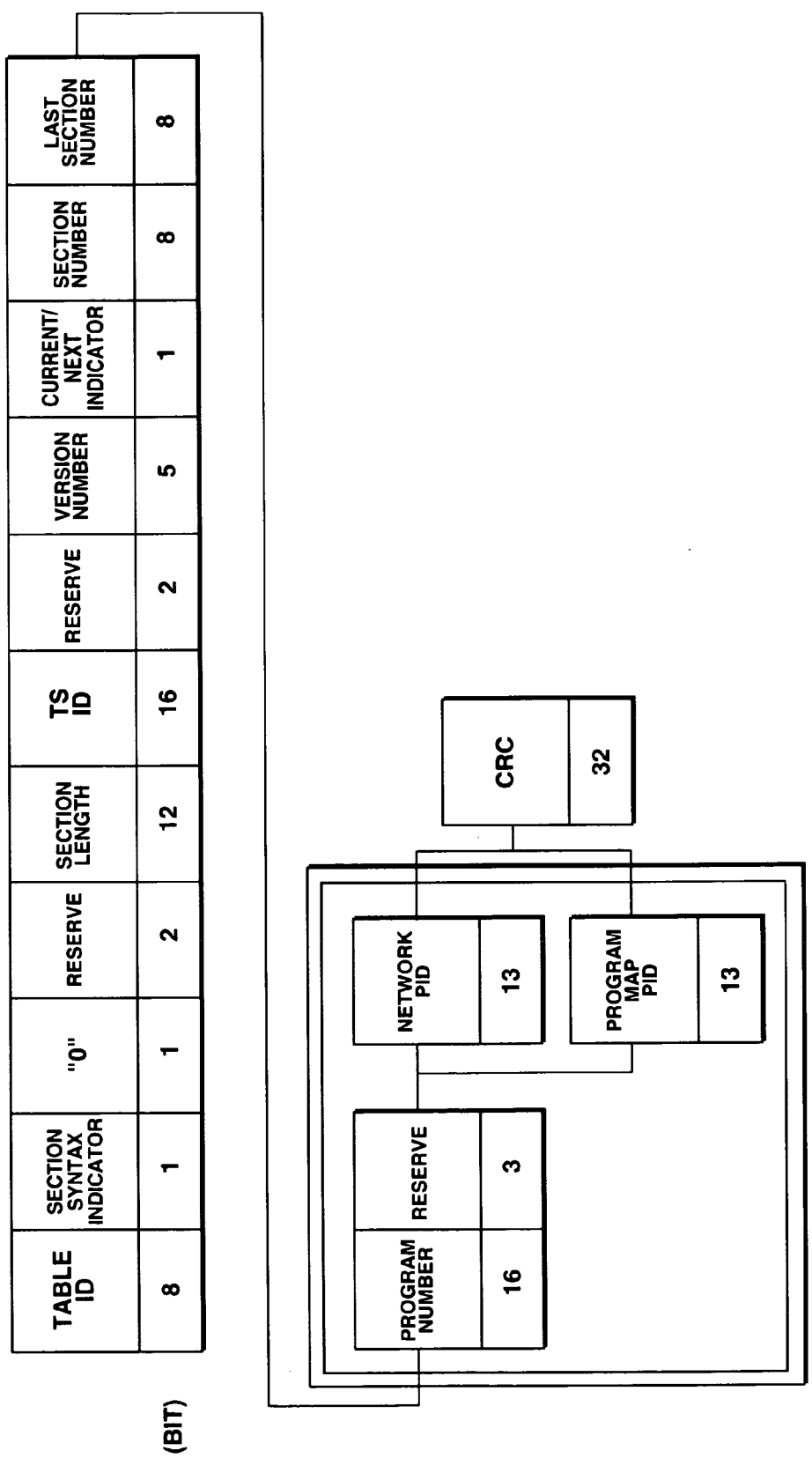
FIG. 9 is a view showing the table structure of a program association table (PAT).

The PSI is information necessary to realize easy tuning operation and program selection. The PAT indicates PID of the PMT which transfers information of the packet constituting a program, for every program number (16-bit). FIG. 9 shows the table structure of the PAT. To the PID of the PAT itself, PID="0x0000" is assigned.

Main contents of the PAT will be explained now. The table ID indicates the type of the table and is expressed as "0x00"

(hexadecimal number system) in the PAT. TS ID identifies a stream (which is multi-layered encoded data), and corresponds to a transponder in the case of a satellite. Version number is increased every time when the contents of the table are updated. Current/next indicator is used for identify new and old versions when they are transferred simultaneously. Program number is to identify respective channels. Network PID indicates PID of NIT when the program number is "0x0000". Program map ID indicates PID of PMT.

Figure 10:
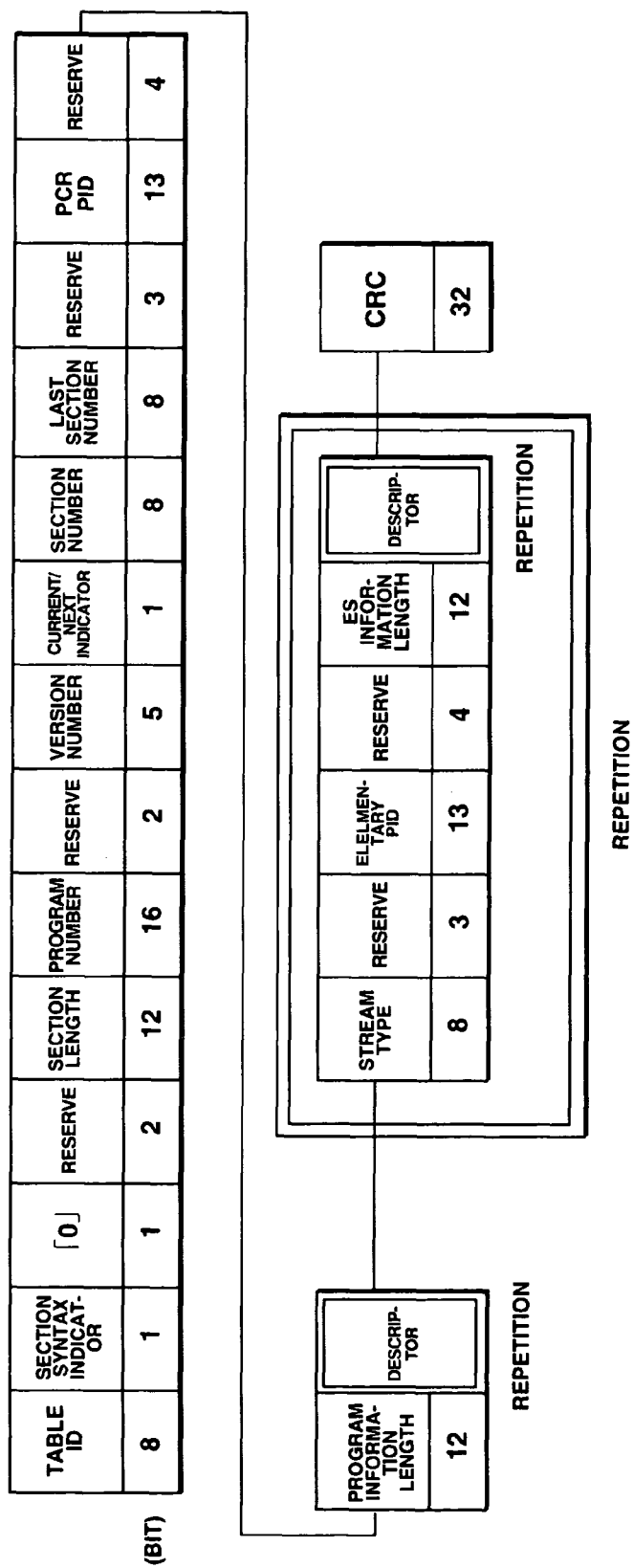
FIG. 10 is a view showing the table structure of a program map table (PMT).

Also, the PMT indicates PID of packets of a program of every program number, wherein the packets transfer streams of video, audio, additional data, and the like constituting a program. The PID of the PMT itself is specified by PAT, as described above. FIG. 10 shows the table structure of the PMT. Main contents which do not overlap the PAT will now be explained. Table ID indicates the type of a table and is expressed as "0x02" in the PMT. PCR PID indicates PID of a packet which contains a clock (PCR: Program Clock Reference). Stream type indicates the type of a signal transferred as a stream, such as video, audio, additional data, and the like.

Figure 11:
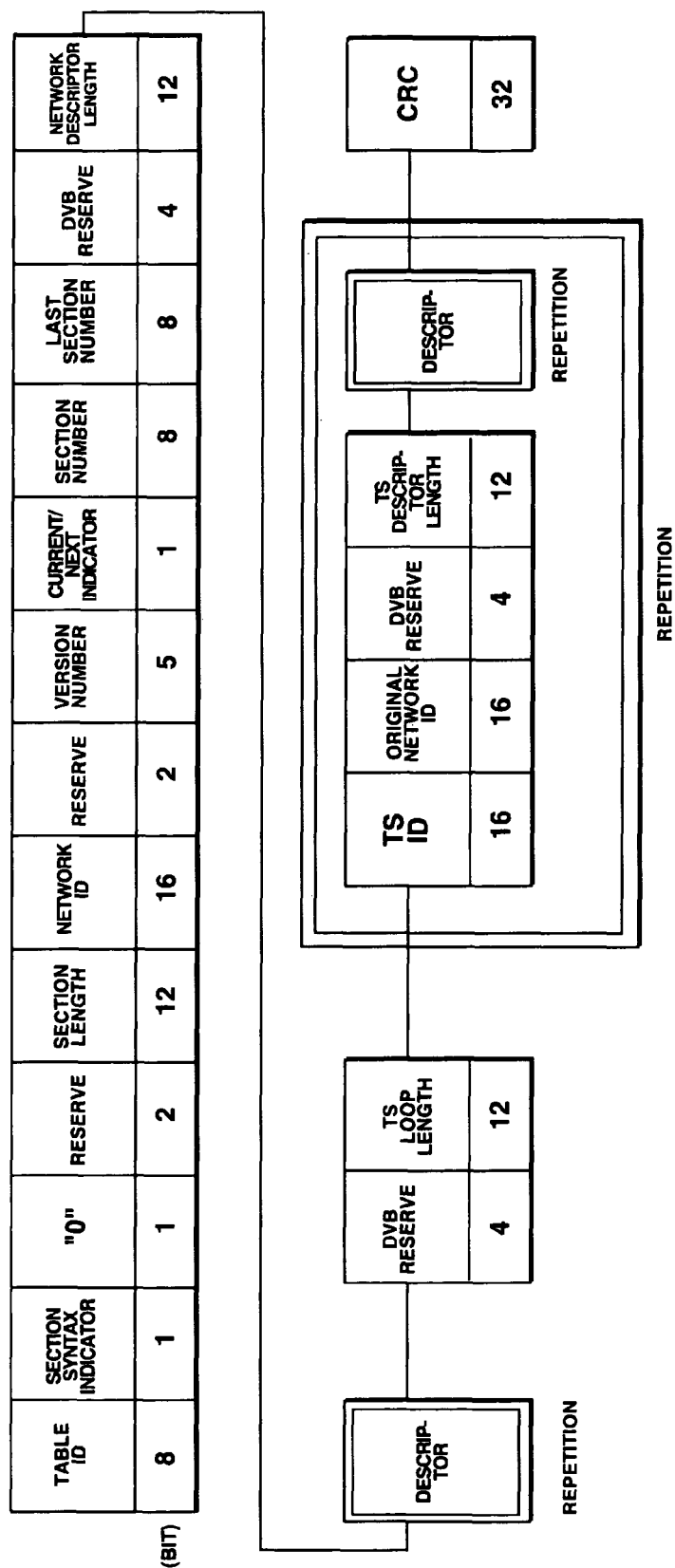
FIG. 11 is a view showing the table structure of a network information table (NIT).

The NIT also indicates physical information of the transmission path, i.e., orbit, wave polarization, frequency for every transponder, and the like in case of satellite. The PID of the NIT itself is specified by the PAT. FIG. 11 shows the table structure of the NIT. Explanation will now be made of main contents which do not overlap PAT or PMT. Table ID indicates the type of a table. The network is expressed as "0x40" and another network is expressed as "0x41". Network ID is used to identify the network. In case of satellite, the network ID correspond to an individual satellite.

To retransmit a satellite digital multi-channel broadcasting signal through cable television according to the modulation conversion method, the NIT is rewritten. Explanation will now be made of a descriptor which is contained in the NIT and requires rewrite.

At first, a satellite delivery system descriptor included in the NIT of a satellite system will be explained. This descriptor is used as the first descriptor which is repeated in accordance with the TS (transport stream) descriptor length, and is paired with the TS ID.

Figure 12:
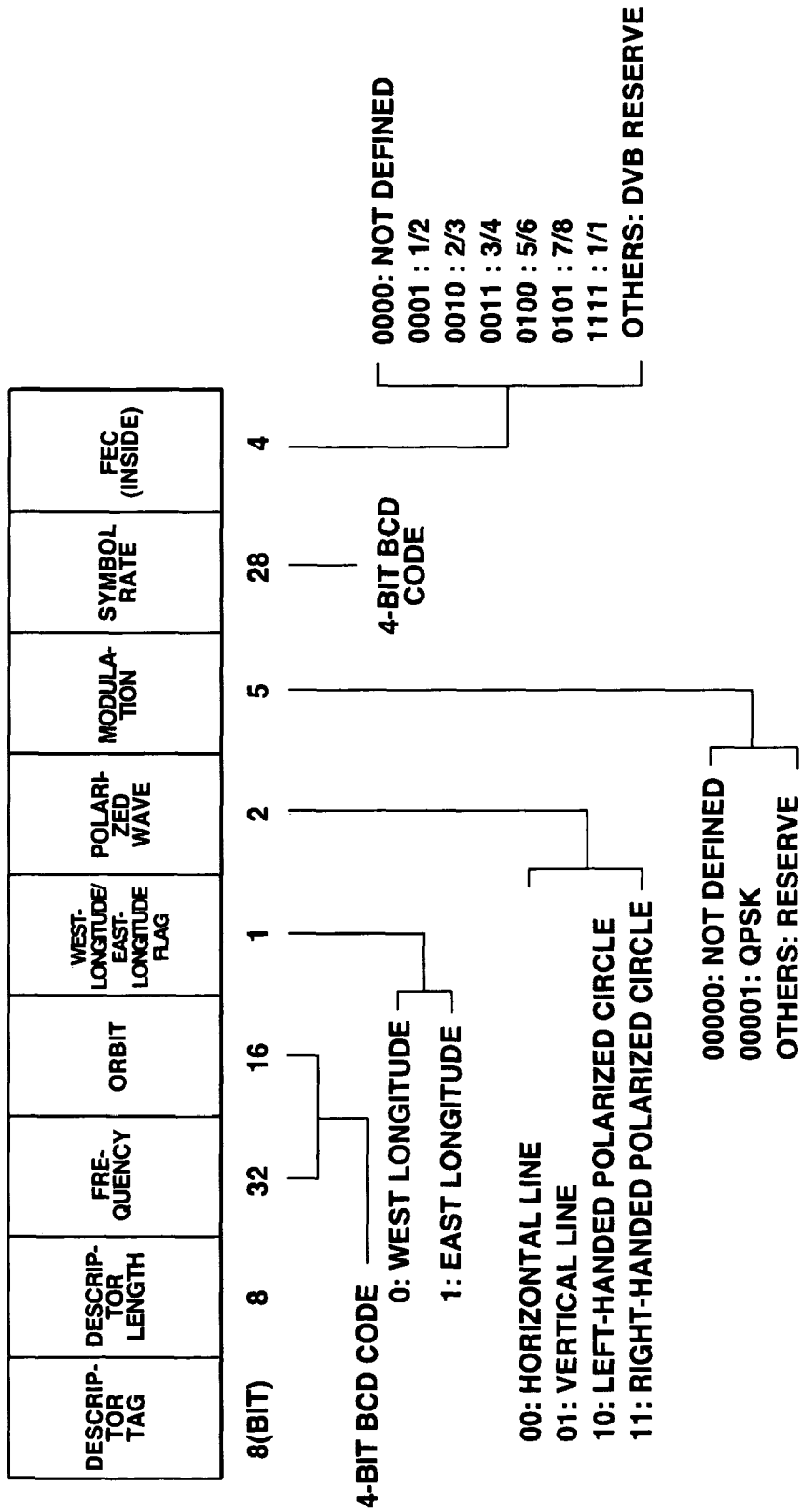
FIG. 12 is a view showing the structure of a satellite delivery system descriptor in the NIT.

FIG. 12 shows the structure of the satellite delivery system descriptor. Descriptor tag is defined by DVB and indicates the type of the descriptor. In this descriptor, the tag is "0x43". Frequency indicates the transfer frequency for every stream (or for every transponder in this case). Orbit/West-Longitude/East-Longitude flag indicates the orbit of a satellite and a polarized wave. Modulation/Symbol-rate/inner error correction code rate indicates the specification concerning the transmission method.

Figure 13:
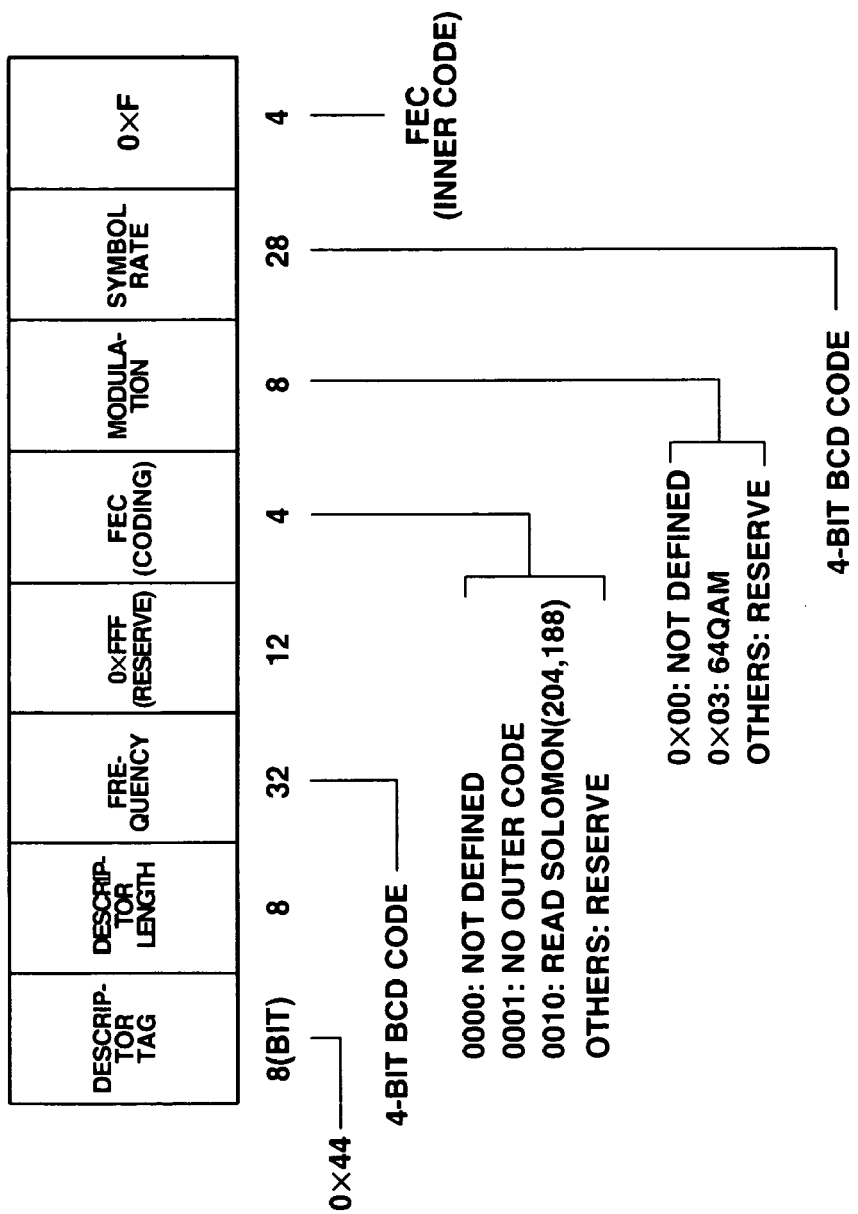
FIG. 13 is a view showing the structure of a CATV delivery system descriptor.

When retransmission is carried out by a cable television station, the satellite delivery system descriptor is replaced with a cable delivery descriptor, as shown in FIG. 13. "0x44" is given in the descriptor. Frequency indicates the transmission frequency for every physical channel of the cable television which carries out the retransmission. Modulation/Symbol-rate/Inner error correction code rate indicates the specification concerning the transmission method. This descriptor has an equal total length for the satellite and the cable and can be replaced simply.

Next, a service list descriptor will be explained. This descriptor is used for the second and later descriptors repeated in accordance with the TS descriptor length. This descriptor also indicates ID of a service (channel) multi-layered on the stream (or transponder in this case). That is, a plurality of service list descriptors are appended to one TS ID.

Figure 14:
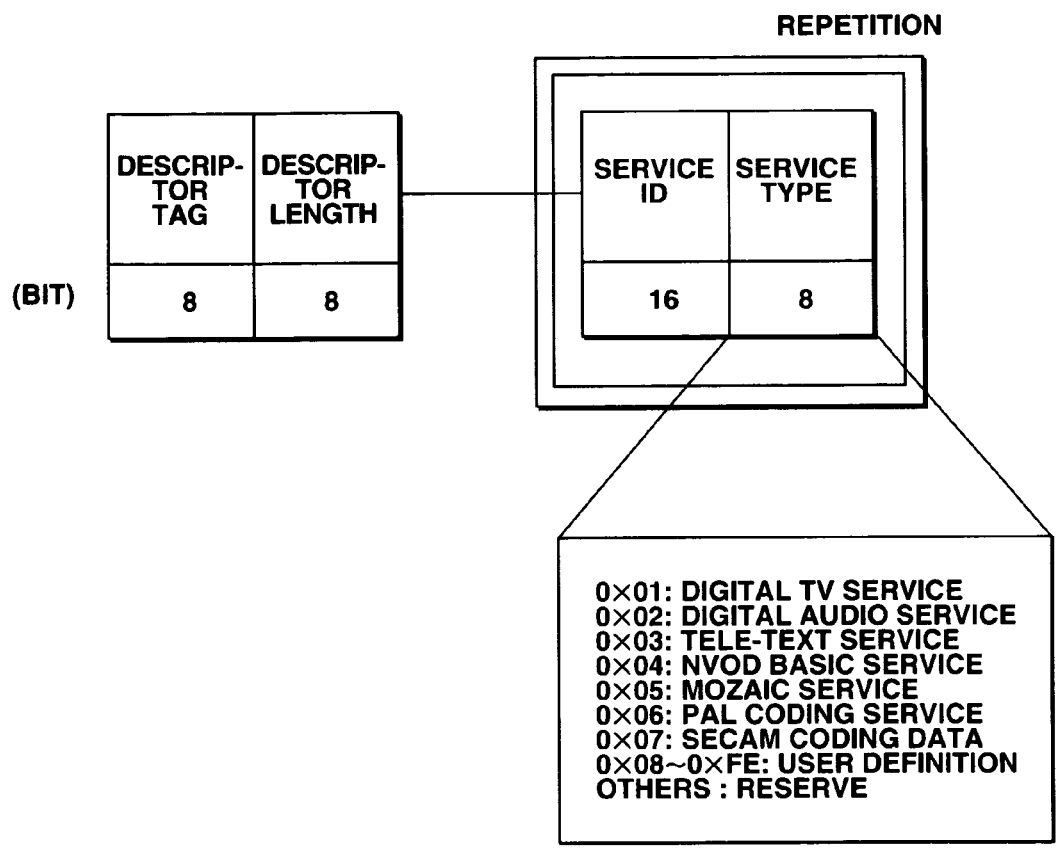
FIG. 14 is a view showing the structure of a service list descriptor in the NIT.

FIG. 14 shows the structure of the service list descriptor. Descriptor tag is defined by DVB and indicates the type of the descriptor. In this descriptor, the tag is "0x41". Service ID is to identify services. Normally, a service is equal to the channel selected by an audience. Service type indicates the contents of a service, such as video, audio, data, and the like.

When retransmission is carried out by a cable television station, the information of this descriptor is directly used if programs for all transponders are served within the range of the cables. However, service IDs of programs included in transponders which are not retransmitted are deleted if only the signal of a specific transponder is served. In this case, dummy data for the deleted information is added, and the total length of the service list descriptor is equalized to that for the satellite system. Replacement can be achieved simply.

The MPEG2 system defines that transmission of a PSI table is achieved by segmentation according to a format called Section. For example, NIT is sectioned for every 4 k bytes, and each section is constructed by the format shown in FIG. 11. The NIT is thus divided into a plurality of sections which are related with each other by section numbers. A total section number is described as a last section number in the table. Sections up to the section having a section number equal to the last section number construct a series of NIT data.

Figure 5:
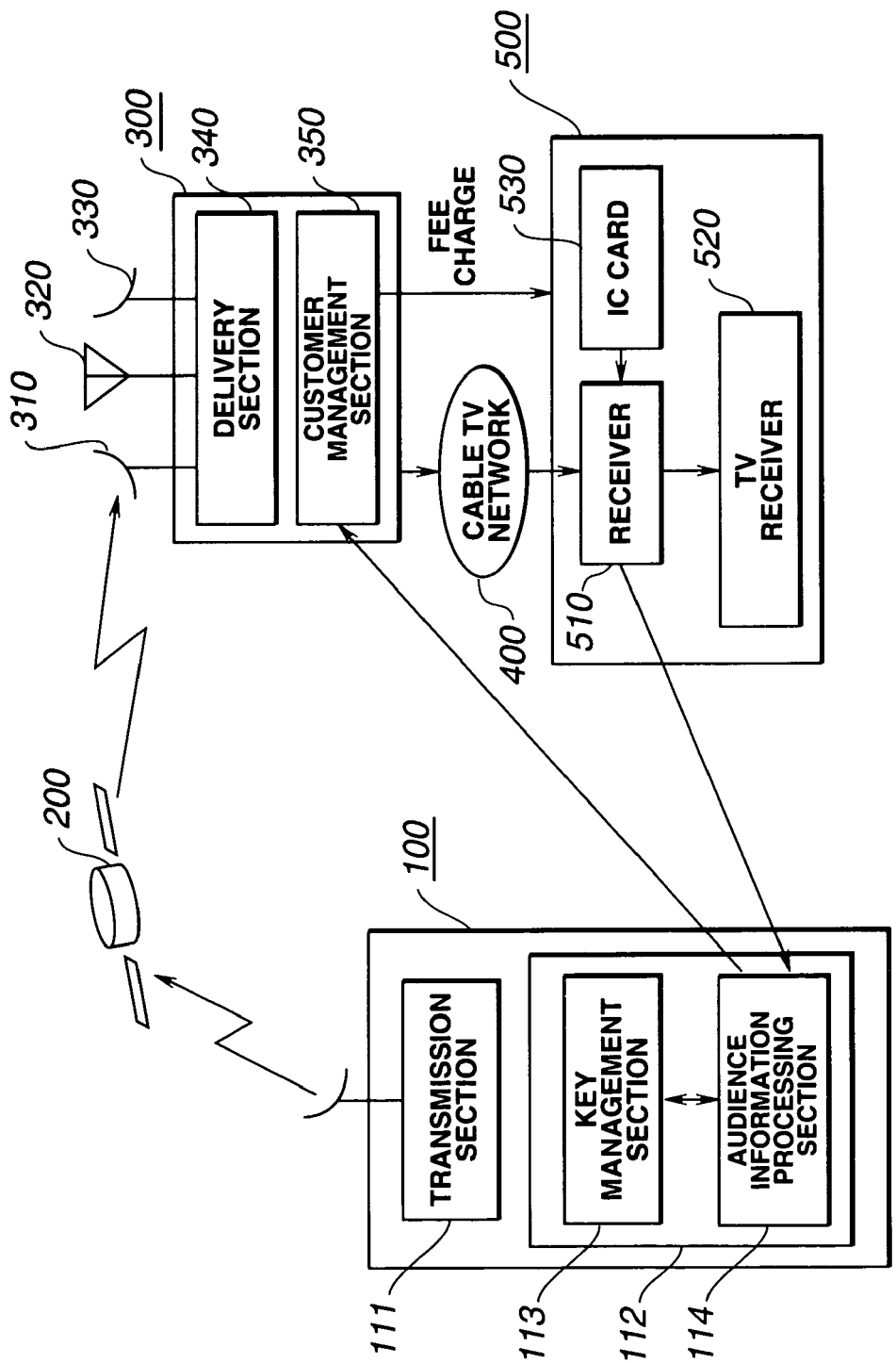
FIG. 5 is a view showing the structure of each of the center station, the cable TV station, and a receiving terminal apparatus in the cable transmission system.

A specific structural example of a delivery section 340 of a cable TV station 300 in the cable transmission system shown in FIG. 5 will be explained with reference to FIG. 15.

Figure 15:
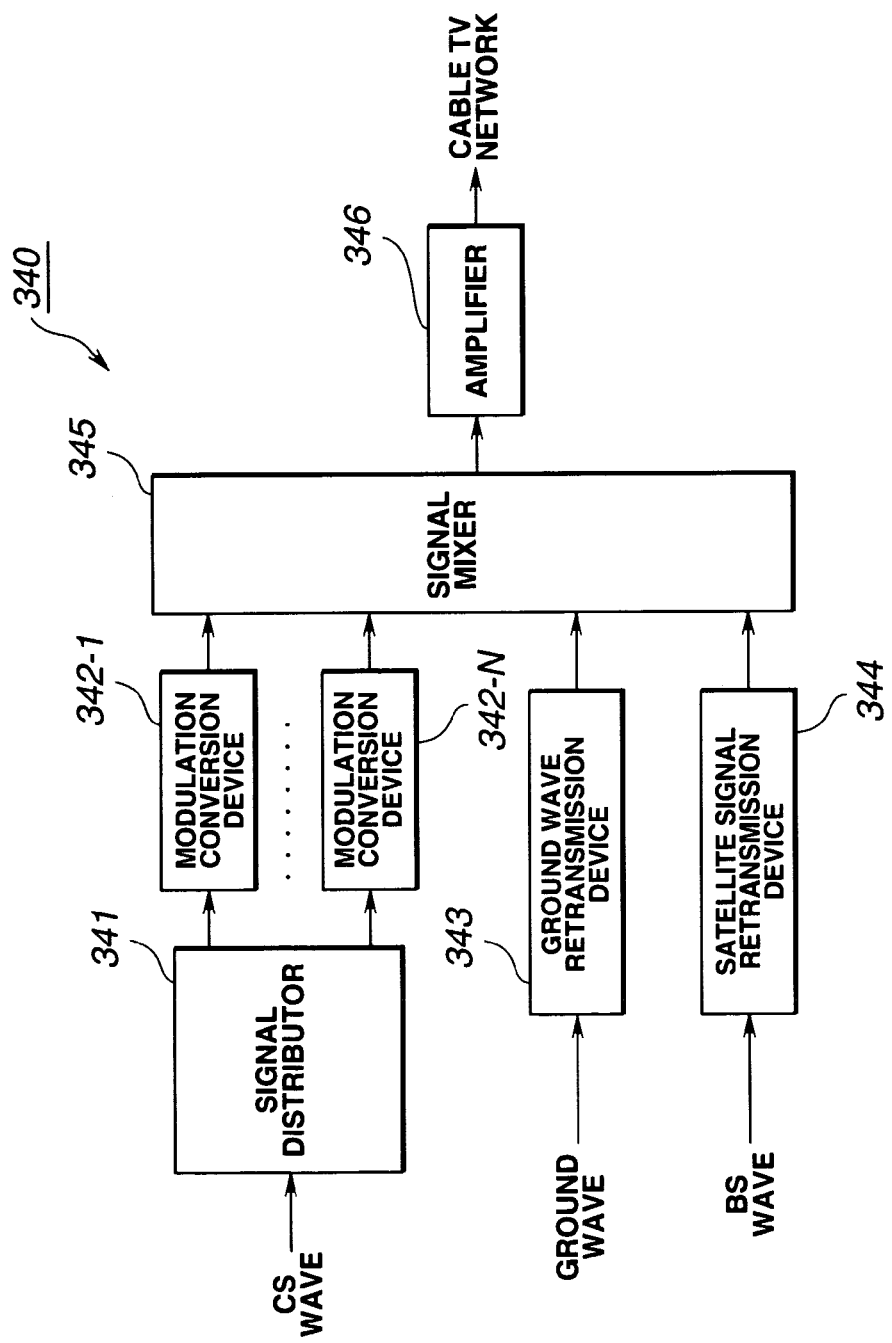
FIG. 15 is a block diagram showing a structural example of a delivery section of a cable TV station in the cable transmission system.
Figure 16:
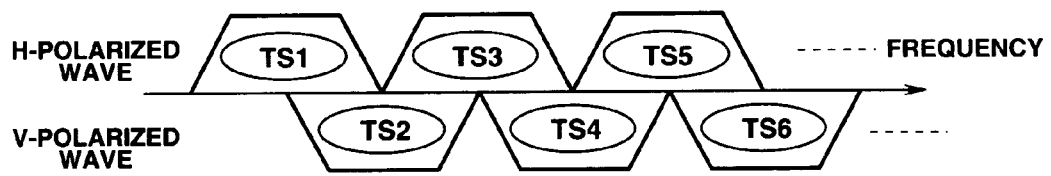
FIG. 16 is a view which explains a linear polarized wave of a CS wave.

In the delivery section 340 having the structure shown in FIG. 15, the signal distributor 341 divides a CS wave inputted through a CS antenna 310 into TSs (Transport Streams) for respective channels, and outputs them to the modulation conversion devices 342-1 to 342-N (where N is the number of channels included in the CS wave), respectively. The channel described above is different from the channel (e.g., broadcasting stations) in the case of a ground wave, but is a propagation wave which includes a plurality of programs multi-layered by one transponder. FIG. 16 shows an example of a state of the CS wave before being inputted to the signal distributor 341. That is, the H-polarized wave of the CS wave contains TS1, TS3, and TS5, while the V-polarized wave of the CS wave contains TS2, TS4, and TS6.

The modulation conversion device 342 converts an inputted TS into a signal (QAM signal) corresponding to one channel of the cable TV, and outputs it to a signal mixer 345.

A ground wave retransmission device 343 RF-converts a ground wave received through a ground wave receiving antenna 320 and outputs it to the signal mixer 345. A satellite signal retransmission device 344 RF-converts a BS wave received through a BS antenna 330, and outputs it to the signal mixer 345.

Figure 17:
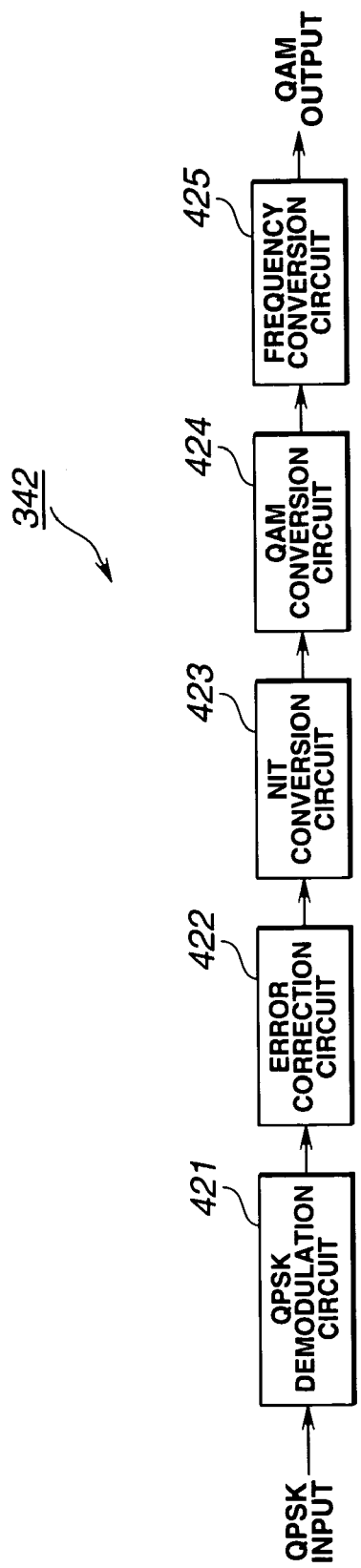
FIG. 17 is a block diagram showing a structural example of the modulation conversion device in the delivery section.

FIG. 17 shows a specific structural example of the modulation conversion device 342. In the modulation conversion device 342 shown in FIG. 17, a QPSK demodulation circuit 421 QPSK-demodulates an inputted TS and outputs it to an error correction circuit 422. The error correction circuit 422 subjects the inputted signal to an error correction, and outputs the corrected TS to a network information table (NIT) conversion circuit 423.

NIT conversion circuit 423 replaces the NIT for a CS wave (which indicates information common to all channels of the CS wave and concerning programs contained in a channel (propagation wave) and is necessary when receiving a desired program by a receiver) with NIT for cable TV, and outputs it to a QAM modulation circuit 424.

The QAM modulation circuit 424 subjects an inputted signal to QAM modulation, and outputs it to a frequency conversion circuit 425. The frequency conversion circuit 425 converts the frequency of the inputted signal into a predetermined value, and outputs it to the signal mixer 345.

Figure 18:
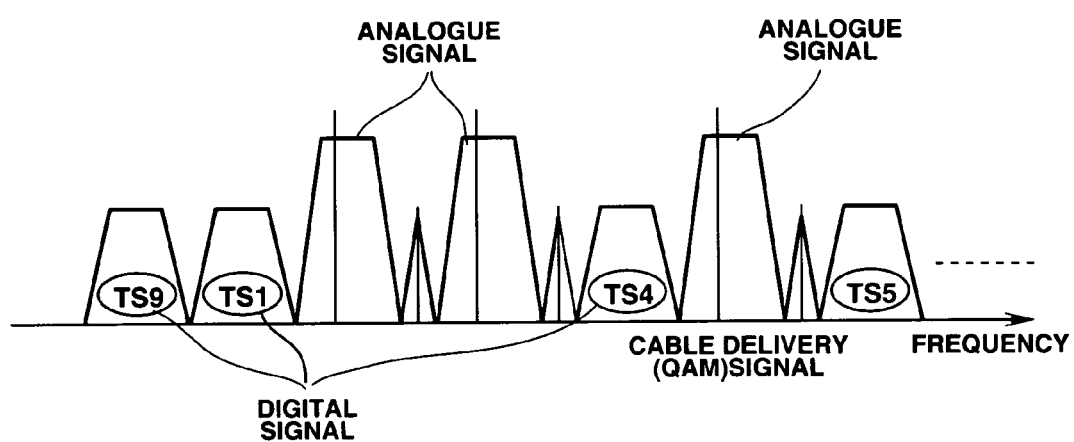
FIG. 18 is a view which explains a mixed wave.
Figure 19:
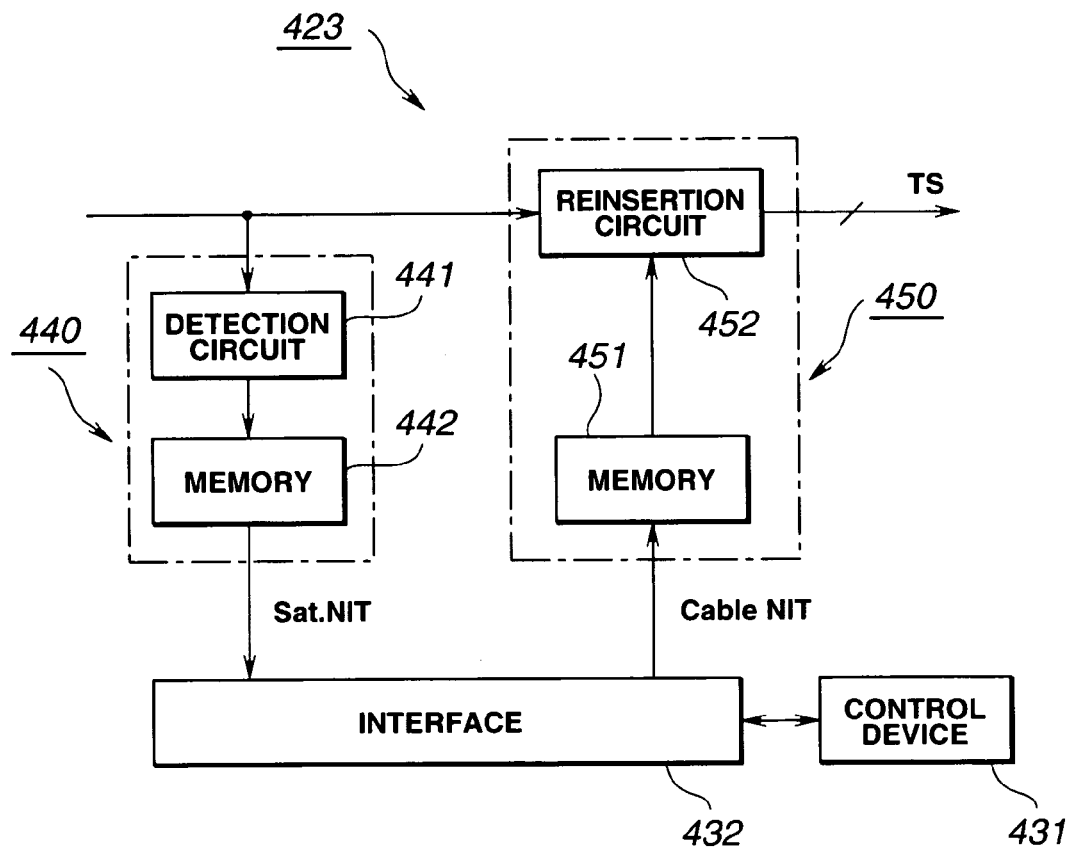
FIG. 19 is a block diagram showing a structural example of a NIT conversion circuit in the modulation conversion device.

The signal mixer 345 mixes signals inputted from the modulation conversion devices 342-1 to 342-N, ground wave retransmission device 343, and satellite signal retransmission device 344, for example, as shown in FIG. 18, and outputs it to an amplifier 346. The amplifier 346 amplifies the inputted mixed wave and supplies it to the receiver 510 through the cable TV network 510.

In cable transmission, the quality of transmission path is excellent compared with a satellite channel. Therefore, only the Read Solomon (204, 188) is added. Suppose now that data of 42.192M bps encoded at a convolution rate of ¾ is transmitted only in the satellite system. Then, in the cable system, data 31.644 Mbps is transmitted in the cable system. To transmit this amount of information through one cable channel having a bandwidth of 6 MHz, it is suitable to use 64QAM as a modulation method. Otherwise, if encoding at a convolution rate of ⅞ is taken in the satellite system, data is transmitted at 36.918 Mbps in the cable system, 128QAM is suitable as a modulation method. Since the level of the QAM modulation method for every channel is indicated by NIT indicating the physical information of a transmission path, the receiver 510 can receive data, changing the receiving method with reference to the level.

A specific structural example of the NIT conversion circuit 423 will explained below with reference to FIGS. 19 to 28.

The NIT conversion circuit 423 comprises a NIT extraction section 440 and NIT reinsertion section 450 which are controlled by a control device 431 through an interface 432. The corrected TS sequentially outputted from the error correction circuit 422 is supplied to the NIT extraction section 440 and the NIT reinsertion section 450.

The NIT extraction circuit 440 is comprised of a NIT detection circuit 441 supplied with the TS, and a memory 442 for temporarily storing NIT detected from the TS by the NIT detection circuit 441.

Figure 20:
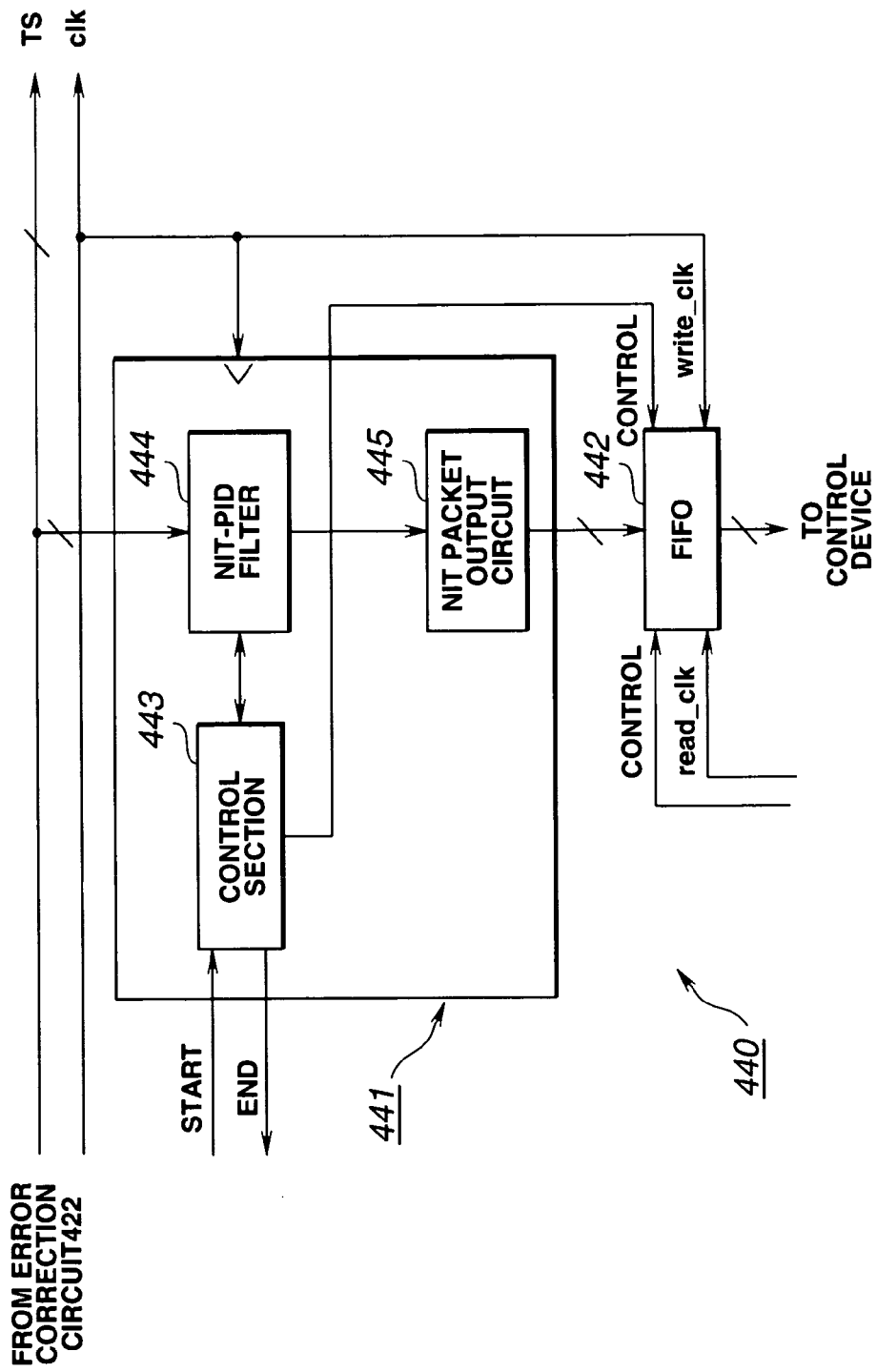
FIG. 20 is a block diagram showing a structural example of a NIT extraction section in the NIT conversion circuit.

As FIG. 20 shows a specific structural example of the NIT extraction section 440, the NIT detection circuit 441 is comprised of a NIT-PID filter 444 controlled by a control section 443, and a NIT packet output circuit 445 for outputting the NIT detected by the filter 444 to the memory 442. Also, the memory 442 is made of a FIFO (First In First Out) memory, and writing and reading of data are controlled by the control device 431 through the interface 432.

If services are provided through a plurality of satellites, a TS includes a plurality of NITs, e.g., NITa (Actual Network Information Table) concerning this TS and NITo (Other Network Information Table) concerning TS transmitted through the other satellites. These NITs can be distinguished from each other by the table IDs. In the NIT extraction section 440 described above, the NIT detection circuit 441 performs NIT detection on both the NITa and NITo, and writes them into the FIFO memory 442 in the order as they are detected. The writing into the FIFO memory 442 is carried out with use of the write clock write_clk synchronized with the TS. Detection of the NIT by the NIT detection circuit 441 and processing of writing into the FIFO memory 442 are carried out in real time.

Figure 21:
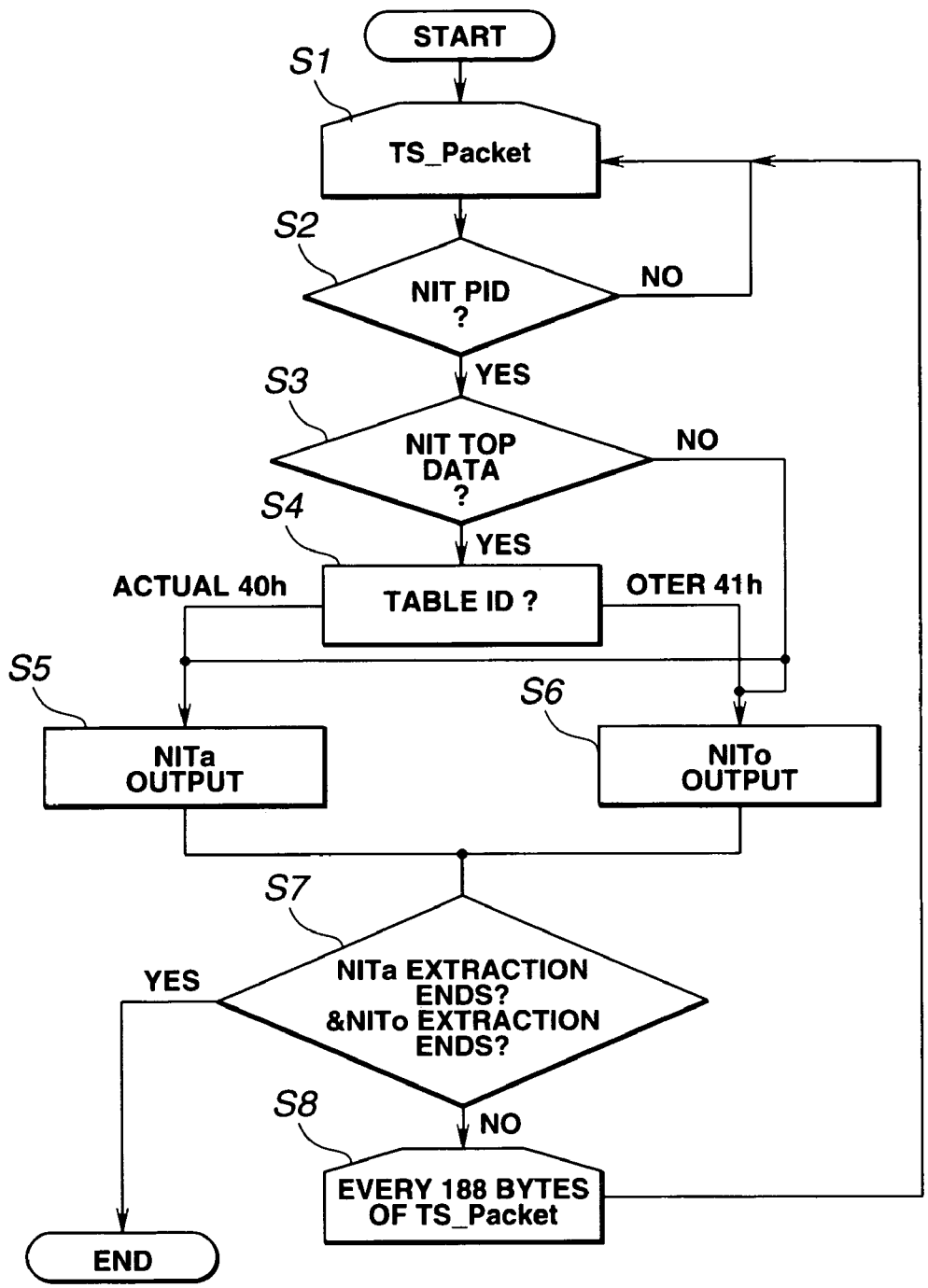
FIG. 21 is a flowchart which explains NIT extraction processing, in the NIT extraction section.

The NIT extraction section 440 performs processing of extracting NIT in accordance with the procedure shown in the flowchart of FIG. 21.

That is, the NIT extraction section 440 is rendered operational when the control section 443 receives a detection start signal "start" from the control device 431, and detects NIT for every TS packet by referring to PID (="0x0010").

The control section 443 takes in TS packets into a NIT-PID filter 444 (step S1), and makes determination concerning the PID of the NIT (step S2). Upon detection of the PID of the NIT, whether or not the PID is the top data of the NIT is determined (step S3). If a table ID is included in the packet where the PID of the NIT has been detected, whether the table is of its own network or another network is confirmed (step S4) by referring to the table ID ("0x40" in case of its own network or "0x41" in case of another network). The NIT detected by the NIT-PID filter 444 is then outputted from a NIT packet output circuit 445. After starting the detection, data is written into the FIFO memory 442 in the order from the top data of the table (i.e., from the table ID) received at first (steps S5 and S6).

Further, the control section 443 determines whether or not both the NITs of NITa of its own network and NITo of another network have been extracted (step S7). If the extraction has not been completed yet, the control section 443 returns to the step S1 thereby to repeat the processing of extracting the NITs for every 188 bytes of the TS packet (step S8).

Figure 22:
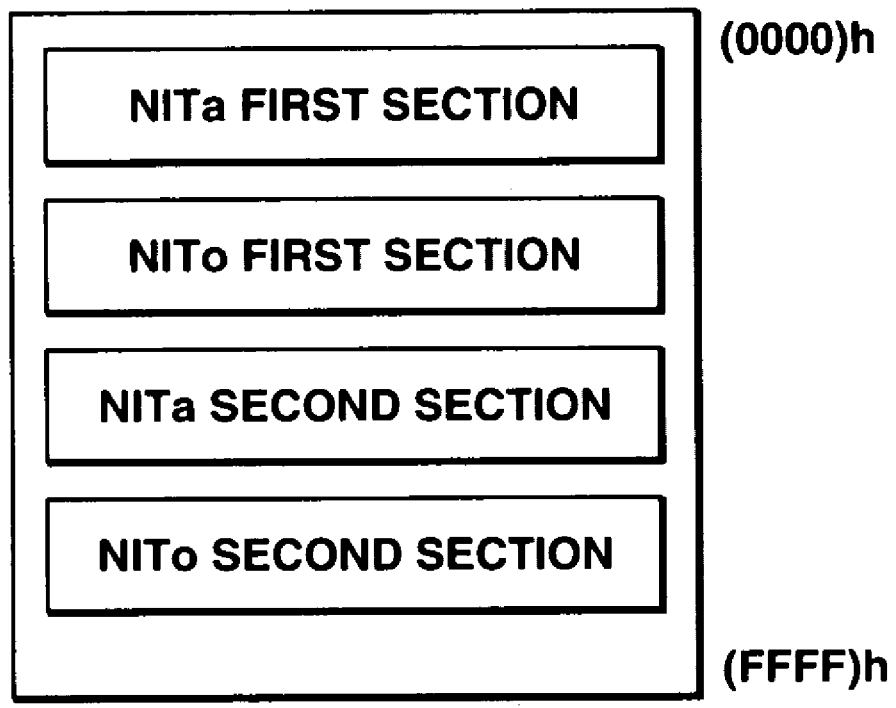
FIG. 22 is a view showing an example of writing into a FIFO memory, in the NIT extraction section.

The control section 443 detects once both the NITs of NITa of its own network and the NITo of another network, and writes them into the FIFO memory 442. Thereafter the section 443 notifies the control device of completion of extraction, and ends the series of detection operation. Therefore, NIT data as shown in FIG. 22 is stored in the FIFO after completion of the writing.

Figure 23:
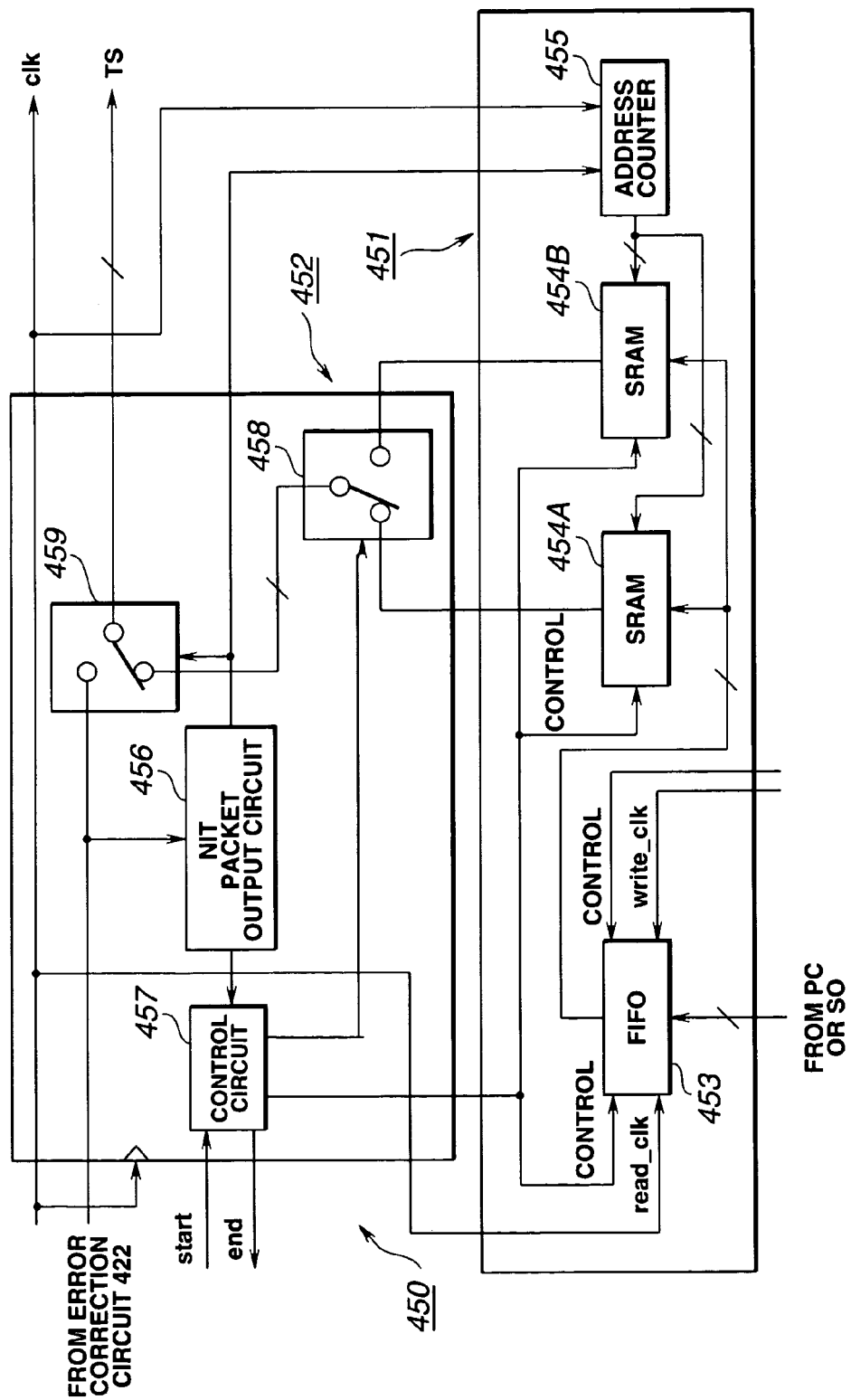
FIG. 23 is a block diagram showing a structural example of a NIT replacement section in the NIT conversion circuit.

Also, the NIT reinsertion section 450 is comprised of a memory section 451 supplied with NIT data for cables through the interface 432 from the control device 431, and a NIT replacement circuit 452 supplied with the TS, as FIG. 23 shows a specific structural example. NIT data for cables are stored in the memory section 451, and NITs of TSs transmitted from a satellite system are sequentially replaced with NIT data for cables, by the NIT replacement circuit.

The memory section 451 is comprised of two SRAMs 454A and 454B, and an address counter 455 for generating addresses for these SRAMs. The SRAMs 454A and 454B serve to draw and store NIT data for cables from FIFO memory 453. Writing of data into this memory section 451 and reading of data therefrom are controlled by the control device 431 through the interface 432. NIT data for cables which is transmitted from the control device 431 through the interface 432 is stored in the FIFO memory 453. The NIT data for cables is drawn from the FIFO memory 453 and stored into the SRAM 454 or SRAM 454B. Every time when NIT of a TS is repeatedly transmitted to the NIT replacement circuit 452 from a satellite system, NIT data for cables is sent from the SRAM 454 or 454B to the NIT replacement circuit 452.

The NIT replacement circuit 452 is comprised of a NIT packet detection circuit 456 supplied with the TS as described above, a control section 457 supplied with the NIT packet detection circuit 456, a ram switch circuit a ram switch circuit 458 controlled to make switching by the control section 457, and a NIT switch circuit 459 controlled to make switching in accordance with the detection output from the NIT packet detection circuit 456.

Writing of data into the two SRAMs 454A and 454B in the NIT reinsertion section and reading of data therefrom are controlled by the control section 457 in the NIT replacement circuit 452. These SRAMs are alternately used every time when NIT is rewritten. That is, while data written in one SRAM 454A is outputted to the NIT replacement circuit 452, the control section 457 of the NIT replacement circuit 452 sets the output of the other SRAM 454B off and writes NIT data for a newest cable into the SRAM 454B through the FIFO memory 453. Upon completion of writing NIT data for the newest cable into the SRAM 454B, the output of the SRAM 454B is set on so that the NIT data can be outputted to the NIT replacement circuit 452. At the same time, the output of the SRAM 454A is set off to wait for next writing. This processing of rewriting NIT data achieved by transferring data from the FIFO memory 452 to the SRAMs 454A and 454B is carried out in real time on clocks synchronized with the TS.

Figure 24:
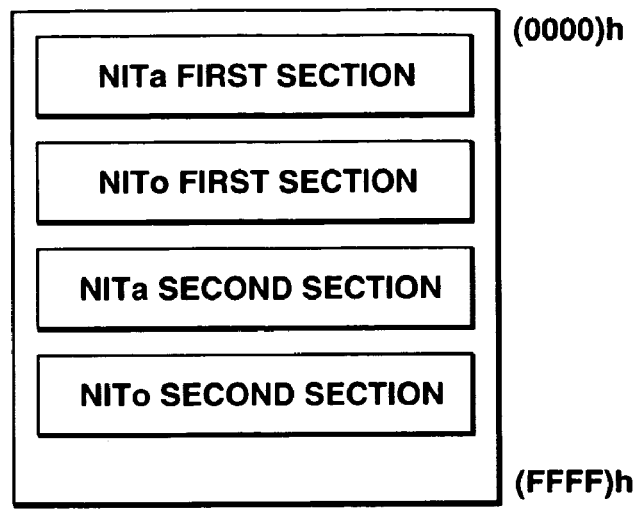
FIG. 24 is a view showing an example of writing into a FIFO memory, in the NIT replacement section.

Into the FIFO memory 453, NIT data for cables is written by the control device 431 through the interface 432, in the order from NITa of its own network to NITo of another network. Thus, the NITa of its own network and the NITo of another network are stored into the FIFO memory 453, as shown in FIG. 24.

Figure 25:
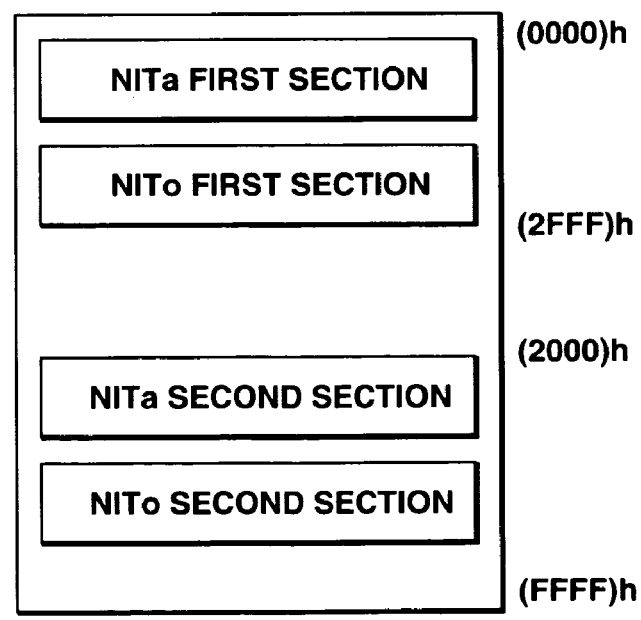
FIG. 25 is a view showing an example of writing into a SRAM, in the NIT replacement section.

Further, when the control section 457 receives a transfer start signal "start", the NIT replacement circuit 452 then transfers NIT data from the FIFO memory 453 to the SRAM 454A or 454B. The transfer operation is started from NITa of its own network. After all the data of NITa is written into the SRAMs, data of NITo of another network is written into a storage place different from the NITa, in the SRAMs. FIG. 25 shows an example of writing NIT data into the SRAMs 454A and 454B.

Figure 26:
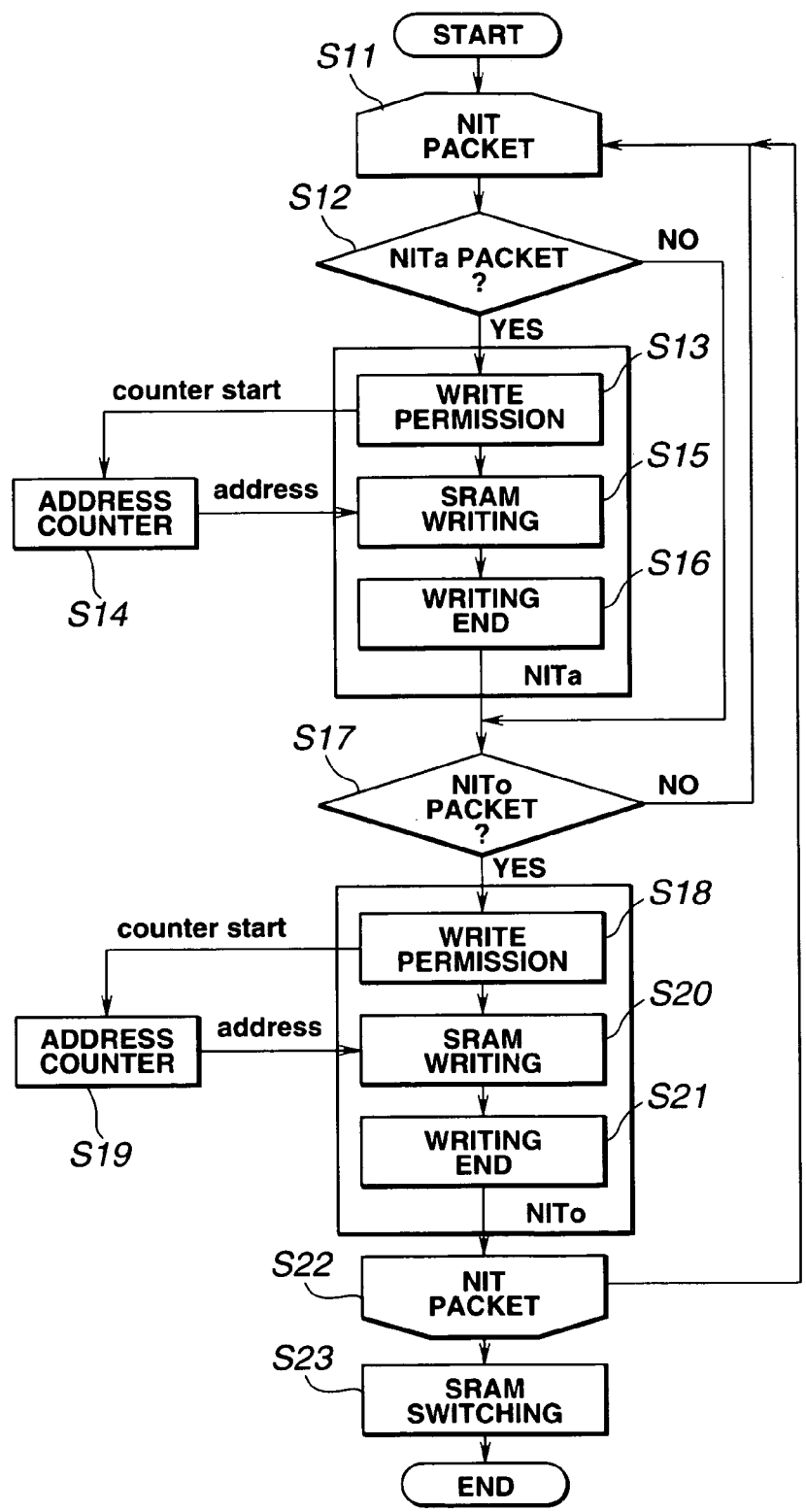
FIG. 26 is a flowchart which explains data transfer processing from the FIFO memory to the SRAM, in the NIT replacement section.

That is, in the NIT replacement circuit 452, the processing of transferring NIT data from the FIFO memory 453 to the SRAMs 454A and 454B is carried out in accordance with the procedure shown in the flowchart of FIG. 26.

In the NIT replacement circuit 452, the RAM switch circuit 458 is controlled to make switching for every TS packet, by the control section 457. For example, in a state where one SRAM 454A selected in correspondence with a TS packet (step S11), whether or not the NIT packet detected by the NIT packet detection circuit 456 is a NITa packet of its own network is determined (step S12). If it is a NITa packet (of its own network), permission to write data into the memory section 451 is issued to the control section 457, and the address counter 455 is started (step S13). The address counter 455 is caused to generate an address (step S14) to transfer and write NITa data of its own network from the FIFO memory 453 to the other SRAM 454B (step S15).

When writing of the NITa data of its own network into the SRAM 454B is completed (step S16), or when the NIT packet detected by the NIT packet detection circuit 456 in the step S12 is not a NITa packet of its own network, whether or not the NIT packet detected by the NIT packet detection circuit 456 is a NITo packet of another network is determined (step S17). If it is not a NITo packet, the processing returns to the step S11 to wait until the NIT packet detection circuit 456 detects a NITa packet of its own network or a NITo packet of another network. Otherwise, if it is a NITo packet, permission to write data into the memory section 451 is issued to the control section, and the address counter 455 is started (step S18). Thus, addresses are generated by the address counter 455, the NITo data of another network is written into the SRAM 454B (step S20).

Upon completion of writing the NITo data of another network into the SRAM 454B (step S21), whether or not processing has ended with respect to one TS packet is determined (step S22). If processing of one TS packet has not been completed yet, the procedure returns to the step S11. Otherwise, if processing has ended with respect to one TS packet, the control device is notified of the completion, and the RAM switch circuit 458 is controlled so as to select the other SRAM 454B (step S23). Processing of transferring NIT data from the FIFO memory 453 to the SRAM 454B is ended.

Thus, the SRAM 454B storing the newly rewritten NIT data is set in an operational state, while the SRAM 454A which has been used is set in a standby state for next NIT rewriting.

Figure 27:
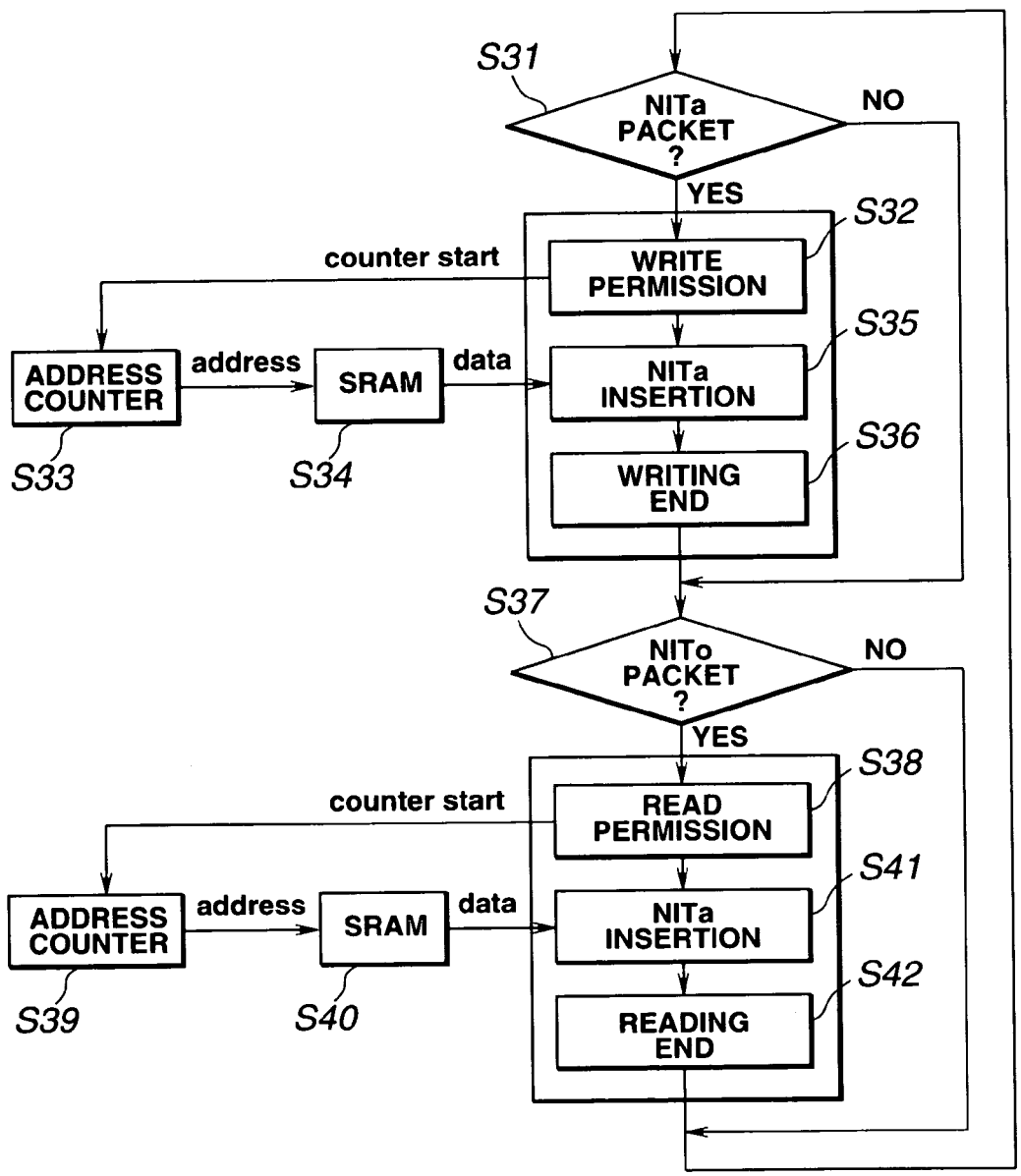
FIG. 27 is a flowchart which explains NIT replacement processing by the NIT replacement circuit in the NIT replacement section.

Also, the NIT replacement circuit 452 carries out replacement processing in accordance with the procedure shown in the flowchart of FIG. 27. In this replacement processing, NIT of TS transmitted from a satellite system is replaced with NIT data for cables with use of NIT data stored in one SRAM 454A, while performing processing of transferring NIT data from the FIFO memory 453 to the other SRAM 454B.

That is, the NIT replacement circuit 452 determines whether or not the NIT packet detected by the NIT packet detection circuit 456 is a NITa packet of its own network (step S31). If it is a NITa packet, permission to read data from the memory section 451 is issued, and the address counter 455 is started (step S32). While addresses are generated from the address counter 455 (step S33), NITa data of its own network is read from the SRAM 454A and is supplied to the NIT switch circuit 459 through the RAM switch circuit 458 (step S34).

In accordance with the detection output from the NIT packet detection circuit 456, the NIT switch circuit 459 is let switch from the side of the error correction circuit 422 to the side of the RAM switch circuit 458 only during the period of the NIT packet. As a result of this, the contents of the NIT packet of TS transmitted from a satellite system are replaced with NITa data for cables (step S35).

When reading of NITa data of its own network from the SRAM 454A is completed (step S36), or when the NIT packet detected by the NIT packet detection circuit 456 is not a NITa packet of its own network, whether or not the NIT packet detected by the NIT picket detection circuit 456 is a NITo packet of another network is determined (step S37). If it is not a NITo packet of another network, the procedure returns to the step S31 to wait until a NITa packet of its own network or a NITo packet of another network is detected. Otherwise, if it is a NITo packet, permission to read data from the memory section 451 is issued, and the address counter 455 is started (step S38). While addresses are generated from the address counter 455, NITo data from another network is read out from the SRAM 454A (step S40).

When reading of NITo data of another network from the SRAM 454A is completed (step S41), the procedure returns to the step S31 to wait until a next NITa packet of its own network or a NITo packet of another network is detected.

In the NIT conversion circuit 423 constructed as described above, NIT data taken in into FIFO memory 442 by the NIT extraction section 440 is sent to the control device 431 through the interface 432. The control device 431 recovers the NIT of the satellite system through software processing, and generates NIT which complies with cable transfer. Further, the NIT data converted for cables is supplied to the FIFO memory 453 of the NIT replacement section 450 through the interface 432 from the control device 431. In the NIT replacement section 450 in this embodiment, data is written in to the FIFO memory 453 in the order from NITa to NITo.

Figure 28:
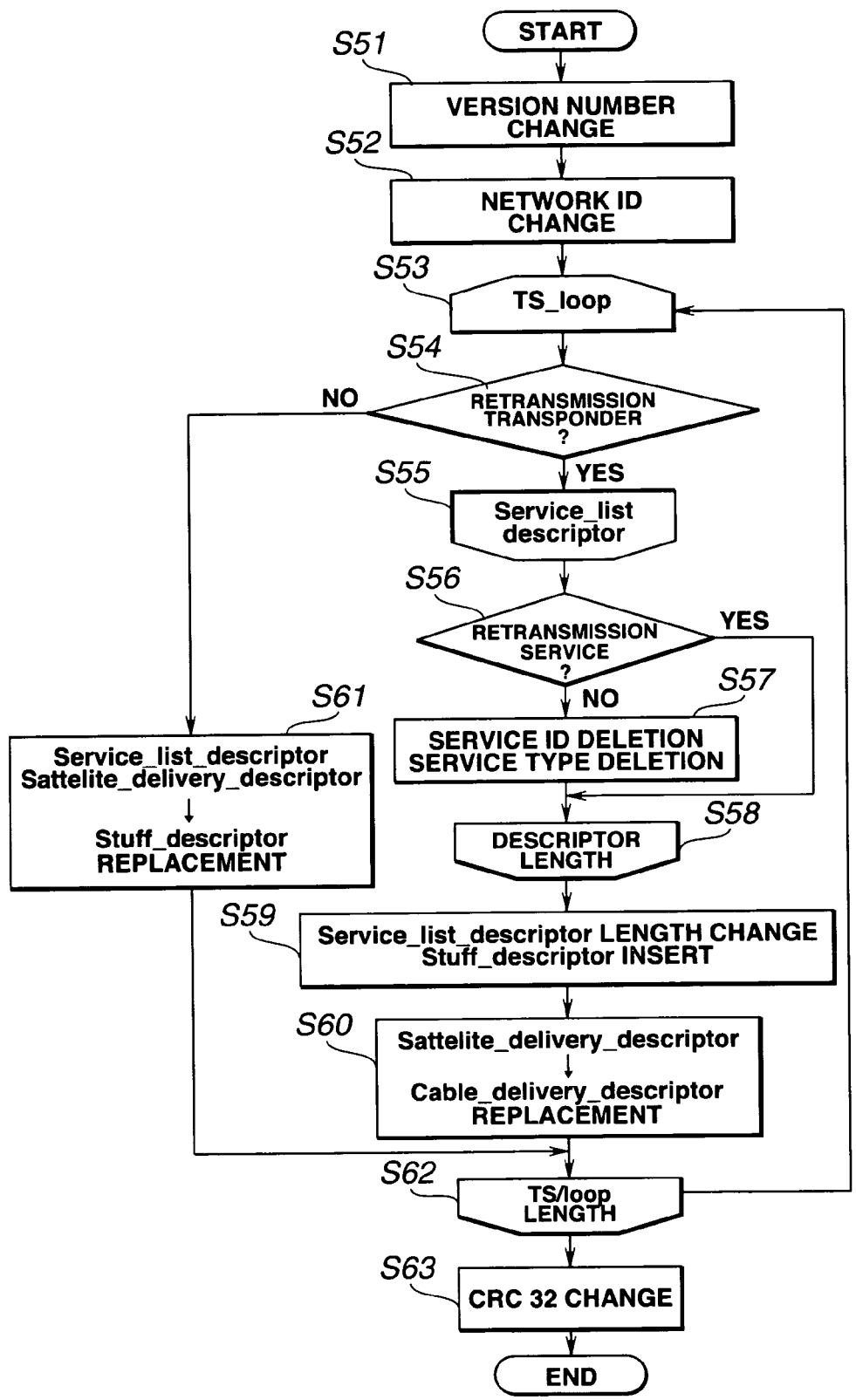
FIG. 28 is a flowchart which explains NIT replacement processing in the NIT replacement section.

In the NIT conversion circuit constructed as described above, NIT processing is carried out in accordance with the procedure shown in the flowchart of FIG. 28.

That is, the version number is changed at first (step S51). If necessary, the network ID is changed (step S52).

The procedure then enters into a processing loop for TS from a satellite network (step S53), and whether or not a stream (a transponder in this case) from the satellite network is a transponder to be retransmitted to a cable network (step S54). If it is a transponder to be retransmitted, it is confirmed that it is a service list descriptor (Service_list_descriptor), and whether or not it is a retransmission service is determined (step S56).

If it is not a retransmission service, the service ID and service type are deleted. That is, information (service ID) and service type of a program which is not served in the stream being retransmitted are deleted (step S57).

If it is a retransmission service, the service ID and service type are not deleted. Thereafter, the descriptor length is confirmed (step S58). The service list descriptor (Service_list_descriptor) length is changed, and a stuffing descriptor (Stuff_descriptor) is inserted (step S59). Further, a satellite descriptor (Satellite_delivery_descriptor) is replaced with a cable delivery descriptor (Cable_delivery_descriptor) (step S60).

Thus, if a stream (transponder) from a satellite network is retransmitted to the cable network in the processing of rewriting NIT, frequency information is matched by replacing at least the satellite delivery descriptor (Satellite_delivery_descriptor) with a cable delivery descriptor (Cable_delivery_descriptor). This is the least necessary processing to enable receiving operation by a receiver for cables. Also, information concerning a stream (a transponder in this case) which is not retransmitted to a cable network, and information (service ID) of a program which is not served in the stream being retransmitted are deleted. The data amount thus reduced is compensated for by dummy data. If necessary, those portions of NIT that are related to the section length and descriptor length are matched with the NIT version number and the bit error index.

Dummy data must be decided so that operation errors are not caused in a receiver. For example, a stuffing table ID and a stuffing descriptor tag are decided as specifications of the transmitter. If these stuffing table and descriptor tag are transmitted, the receiver side should neglect them.

Otherwise, if the stream is not a transponder to be retransmitted, a service list descriptor (Service_list_descriptor) and a satellite delivery descriptor (Satellite_delivery_descriptor) are replaced with a stuffing descriptor (Stuff_descriptor) (step S61).

Ever time when the above-described processing (steps S55 to S60) for a transponder to be retransmitted or the processing (step S61) for a transponder not to be retransmitted is carried out, the loop length of the TS is confirmed and the processing returns to the step S53. The processing in the steps S53 to S62 is repeated over the loop length of the TS (step S62). Thereafter, a CRC 32 is changed (step S63), and the processing of rewriting NIT is ended.

In the same manner as described above, network information concerning another network can be rewritten. For example, when only one service is retransmitted into the network if services are provided through two satellites, sections of NITo of another network are changed into dummy data by using the stuffing table ID. The NITa of each satellite networks is rewritten in compliance with the service within the cable network, and simultaneously, the NITo is rewritten in match with the NITa.

Figure 29:
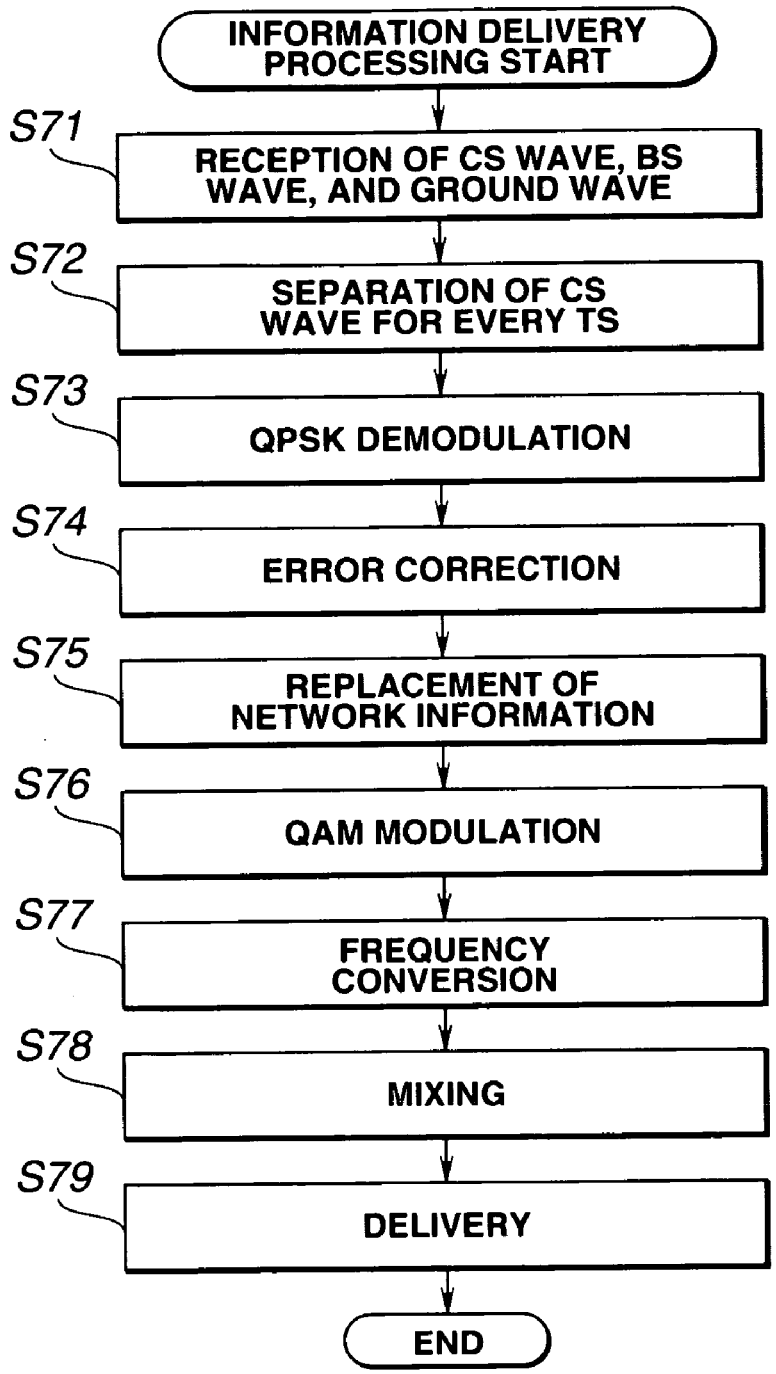
FIG. 29 is a flowchart which explains information delivery processing by the delivery section.

Next, information delivery processing performed by the information delivery section 340 in the cable TV station 300 will be explained with reference to the flowchart shown in FIG. 29.

In the step S71, the CS antenna 310 receives a CS wave through the communication sate 200, and outputs it to the delivery section 340. The ground wave antenna 320 receives a ground wave and outputs it to the delivery section 340. The BS antenna 330 receives a BS wave through a broadcasting satellite, and outputs it to the delivery section 340.

In a step S72, a signal distributor 341 divides a CS wave for every one of TSs corresponding to one transponder, and outputs the results to the modulation conversion devices 342-1 to 342-N. The ground wave retransmission device 343 RF-converts an inputted ground wave and outputs it to the signal mixer 345. The satellite signal retransmission device 344 RF-converts an inputted BS wave and outputs it to the signal mixer 345.

In a step S73, the QPSK demodulation circuit 421 of the modulation conversion device 342 QPSK-demodulates an inputted TS and outputs it to the error correction circuit 422.

In a step S74, the error correction circuit 422 makes error correction on an inputted signal and outputs it to the NIT conversion circuit 423.

In a step S75, the NIT conversion circuit 423 replaces NIT for CS waves with NIT for cable TV, and outputs it to the QAM modulation circuit 424.

In a step S76, the QAM modulation circuit 424 QAM-modulates an inputted signal and outputs it to the frequency conversion circuit 425.

In a step S77, the frequency conversion circuit 425 converts the frequency of an inputted signal into a predetermined value which can be transmitted in the cable TV network 400. The circuit 425 then outputs the signal to the signal mixer 345. In a step S78, the signal mixer 345 mixes together QAM-modulated signals inputted from the modulation conversion devices 342-1 to 342-N, the ground wave retransmission device 343, and the satellite signal retransmission device 344, and outputs a mixed wave to the amplifier 346.

In a step S79, the amplifier 346 amplifies the inputted mixed wave and transmits it to a receiver 510 through the cable TV network 400.

Next, a specific structural example of the receiver 510 in the cable transmission system shown in FIG. 5 will be explained with reference to FIG. 30.

Figure 30:
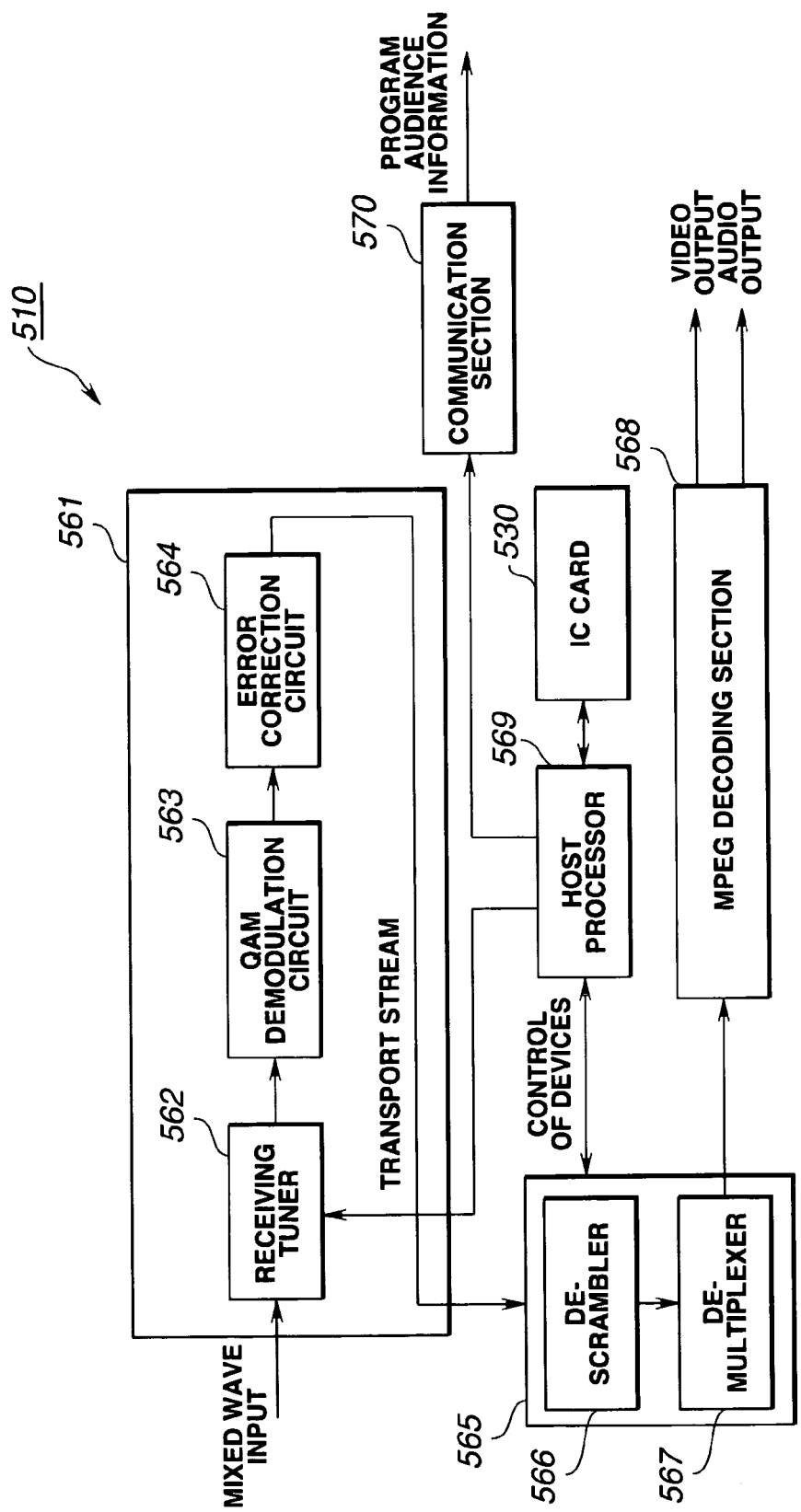
FIG. 30 is a block diagram showing a structural example of a receiver in the cable transmission system.

In the receiver 510 having a structure shown in FIG. 30, a receiving tuner 562 of a cable front end section 561 extracts a TS including a predetermined program from a mixed wave, and outputs it to a QAM demodulation circuit 563. The QAM demodulation circuit 563 QAM-demodulates the inputted TS and outputs it to the error correction circuit 564. The error correction circuit 564 corrects error information of the inputted TS, and outputs it to the transport section 565. A descrambler 566 of the transport section 565 decodes (descrambles) the scramble performed on the TS, with use of descramble information recorded on an IC card 530 issued by a satellite broadcasting service provider 100. The descrambler outputs the descrambled TS to a demultiplexer 567.

The demultiplexer 567 extracts predetermined program information from the TS in which plurality of program information items are multi-layered, and supplies it to a MPEG decoding section 568. The MPEG decoding section 568 MPEG-expands the inputted program information, generates a video signal and an audio signal. This section 568 outputs them to the television receiver 520.

A host processor 569 controls the entire receiver 510, based on a turning operation made by an audience, and records information (program audience information) concerning received fee-charged programs onto an ID card 530. Also, the host processor 569 reads descrambling information recorded on the IC card 530, and supplies it to the descrambler 566. Further, the host processor 569 controls the communication section 570 so as to notify the program audience information recorded on the IC card to an audience information processing section 114 of the satellite broadcasting service provider 100 through a public telephone line.

Figure 31:
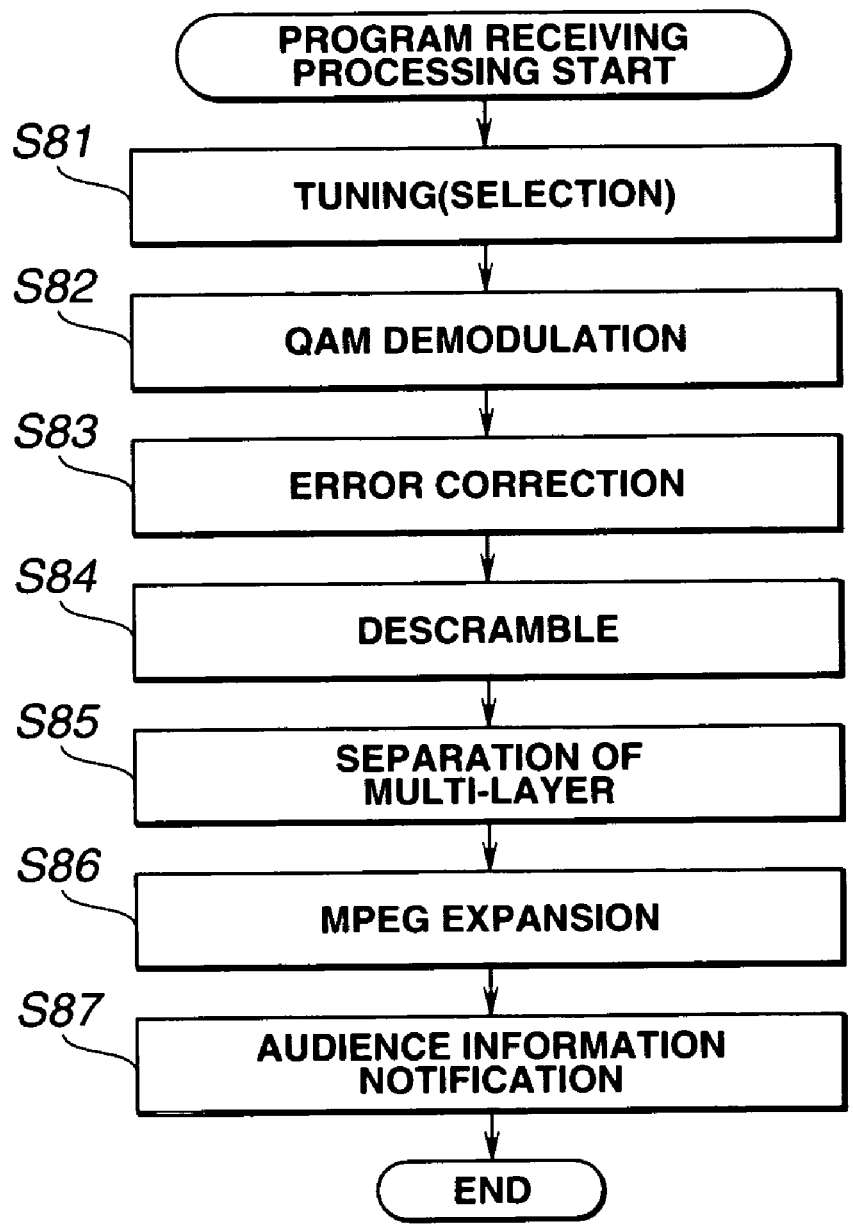
FIG. 31 is a flowchart which explains program receiving processing by the receiver.

Next, program receiving processing in the receiver 510 will be explained with reference to the flowchart in FIG. 31.

In a step S81, the receiving tuner 562 of the cable front end section 56 extracts a TS containing a program selected by an audience (a program included in a CS wave), and outputs it to the QAM demodulation circuit 563.

In a step S82, the QAM demodulation circuit 563 QAM-demodulates an inputted TS and outputs it to the error correction circuit 564.

In a step S83, the error correction circuit 564 corrects error information of the inputted TS and outputs it to the transport section 565.

In a step S84, the descrambler 566 in the transport section 565 decodes the descramble performed on the TS, with use of descrambling information recorded on the IC card 530 issued by the satellite broadcasting service provider 100, and outputs the descrambled TS to the demultiplexer 567.

In a step S85, the demultiplexer 567 separates multiple layers of the TS from each other, extracts the information of the program selected by the audience, and supplies it to the MPEG decoding section 568.

In a step S86, the MPEG decoding section 568 MPEG-expands the inputted program information to generate a video signal and an audio signal, and outputs them to the television receiver 520. The television receiver 520 reproduces the inputted video signal and audio signal.

In a step S87, the host processor 569 records the information (program audience information) of the received program onto the IC card 530 if the received program is a fee-charged (pay-per-view) program. The communication section 570 periodically notifies the program audience information recorded on the IC card 530 to the customer management section 115 through a public telephone line and the audience information processing section 114.

If an audience selects a program transmitted by a ground wave or a BS wave, the program information thereof is not multi-layered or subjected to MPEG compression. Therefore, the separation of multiple layers in the step S85 and the MPEG expansion in the step S86 are not carried out.

Next, explanation will be made of an operation example of the receiver 510 of the receiving terminal device 500 which receives a signal transmitted from the cable TV station 300, with reference to the flowchart shown in FIG. 32.

In PAT and PMT, the program number corresponds to the channel number selected by an audience. In NIT, the service ID corresponds to the channel number as well. Further, the NIT includes information of the entire network, i.e., the information of all transponders, and one same table is transferred in parallel in all transponders. In contrast, each of the PAT and PMT includes only the information of programs on the physical channel which transmits the PAT or PMT.

For example, when an audience selects a channel "M", the host processor 569 controls the multiplexer 567 so as to obtain NIT with fixed PID. The host processor 569 searches "M" from the service ID in the service list descriptor appended to each TS ID of the NIT (step S91).

If there is a service ID "M" (step S92), the host processor 569 recognizes the frequency of the transponder which transmits the channel "M", from the CATV delivery system descriptor combined in front of the service list descriptor including the service ID "M", and controls the receiving frequency of the tuner 562 (step S93). As a result, the tuner 562 selects a digital broadcasting signal from the modulation conversion device 342 which transmits the channel "M".

Further, the host processor 569 controls the demultiplexer 567 so as to obtain PAT by means of a fixed PID. The host processor 569 searches "M" from the program number in the PAT, and obtains a program map PID appended to the program number "M" (step S94). The host processor 569 then controls the demultiplexer 567 so as to obtain PMT by means of the program map PID, and recognizes an elementary PID for every stream type (video, audio, or the like) corresponding to the program number "M" in the PMT (step S95).

Further, the host processor 569 controls the demultiplexer 567 so as to separate a TS packet having a PID equal to the elementary PID (step S96). In this case, the host processor 569 separates packets of video data and audio data of the channel "M", as well as packets of data added to the channel "M".

The host processor 569 supplies the IC card 530 with receive-limit information extracted from the added data stream SDS. The IC card 530 determines whether watching and hearing are enabled or disabled. If watching and hearing are enabled, key information of scrambling is sent to the host processor 569. This key information is set into the descrambler 566. As a result, the descrambler 566 releases the scrambling of packets of video data and audio data. Therefore, a video data stream and an audio data stream obtained from the demultiplexer 567 are related to data whose scrambling has been released.

Further, video data and audio data outputted from the demultiplexer 567 are decoded, so the video signal and audio signal of the channel "M" are obtained (step S97). That is, the MPEG decoding section 568 performs processing of data expansion and the like on the video data stream VDS outputted from the demultiplexer 567. A video signal SV is thus generated and is outputted. Also, the MPEG decoding section 568 performs processing of data expansion and the like on the audio data stream outputted from the demultiplexer 567. An audio signal is thus generated and outputted. By supplying the video signal and the audio signal obtained by the MPEG decoding section 568 to the TV receiver 520, the image of the channel "M" can be displayed and the audio of the channel "M" can be outputted.

If there is no service ID "M" as a result of searching "M" from the service ID in the service list descriptor appended to each TS ID in the step S92, the host processor 569 lets the display section indicate that receiving is disabled (step S98). The receiving operation is then ended. Therefore, receiving of a service (program) is disabled for the receiver 51 if information concerning the TS ID and information concerning a service in the service list descriptor are deleted from NIT, regarding them as information of a service (program), watching and hearing of which should be limited, in the NIT conversion circuit 423, as has been described above.

Figure 32:
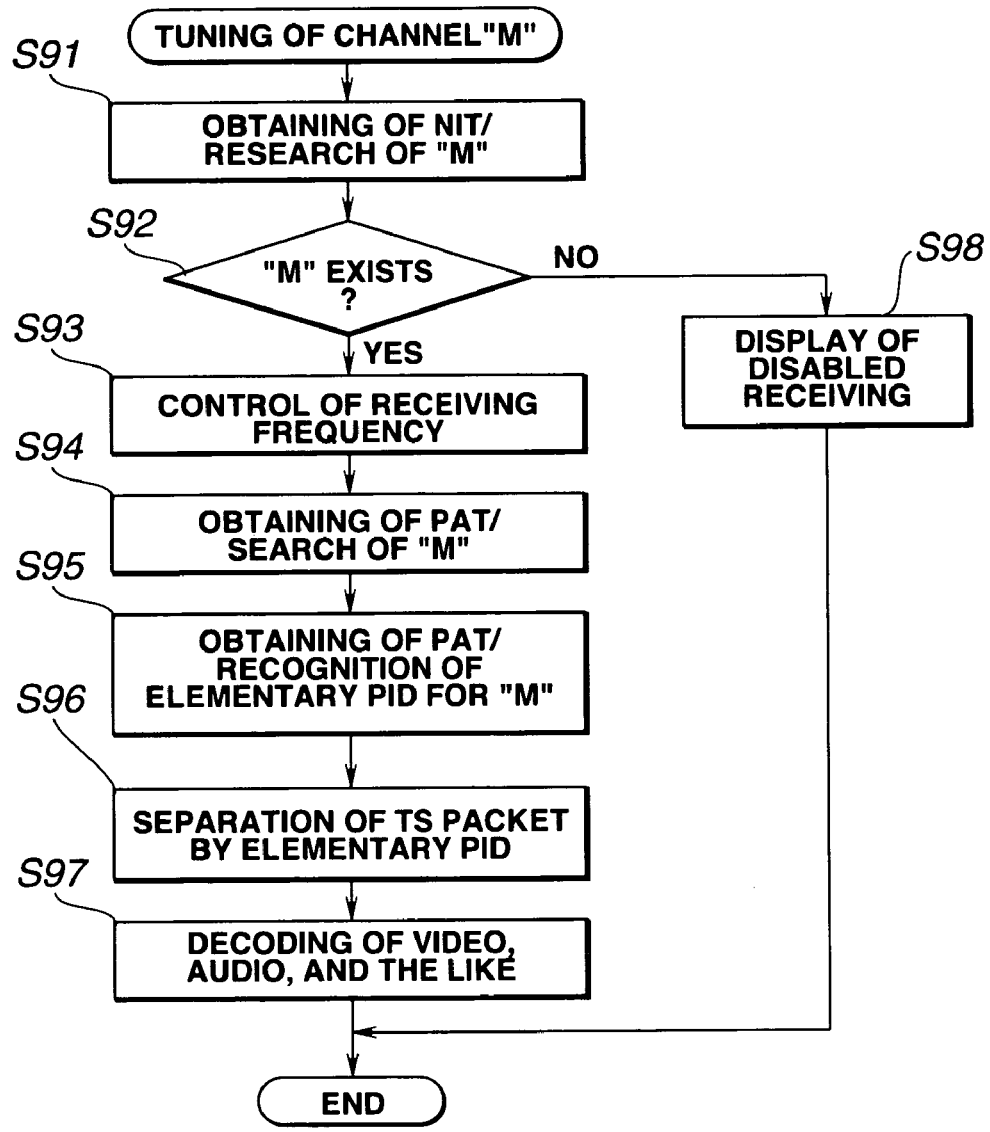
FIG. 32 is a flowchart which explains processing of selecting a channel "M" by the receiver.

With respect to the flowchart in FIG. 32, it has been explained that NIT is obtained in the step ST1 and "M" is searched with use of the NIT, every time when the channel "M" is selected. However, NIT may be obtained and stored into the internal memory of the host processor 569, every time when the contents are changed. This NIT may be used to search "M". In this respect, a change of contents is recognized from the version number.

In the present embodiment, explanation has been made of a case where the signal of digital satellite broadcasting is retransmitted to the cable TV network. However, the present embodiment is applicable to cases where the signal of digital ground-wave broadcasting is retransmitted to the cable TV network and where the signal of a digital satellite method is retransmitted to the ground-wave broadcasting.

The receiver 510 of the present embodiment shown in FIG. 30 can be realized by replacing the satellite front end section 91 of the receiver 32 for the digital satellite broadcasting with the cable front end section 561. Therefore, the manufacturing costs can be reduced.

In addition, audience information management which needs the highest costs for the cable TV can be also carried out by one same satellite broadcasting service provider. Therefore, the costs for this management can be reduced.

Computer programs for performing the processing as described above can be provided for users not only by distribution media such as a magnetic disk, CD-ROM, and the like but also by network delivery media such as Internet, a digital satellite, and the like.

As described above, according to the present invention, a digital multi-channel service signal is delivered to a plurality of cable network stations through a satellite channel from a center station. The digital multi-channel service signal delivered through the satellite channel from the center station is converted into a digital multi-channel service signal for cable transmission by modulation conversion, and is delivered to receiving terminal devices through each cable network station. Thus, programs broadcasted on the digital satellite broadcasting can be distributed to the cable television network at low costs.

The invention claimed is:

1. An information transmitting apparatus for transmitting information through a first transmission path, comprising:
   receiving means for receiving a broadcasting signal from a second transmission path;
   demodulation means for demodulating the signal received by the receiving means;
   modulation means for modulating the signal demodulated by the demodulation means,
   wherein when the second transmission path includes services of a plurality of satellites belonging to different networks, the demodulated signal from the second transmission path includes network information of the different networks, including an actual network information table and an other network information table,
   extraction means for extracting the actual network information table and the other network information table from the demodulated signal, and storing the extracted information in a FIFO memory,
   wherein the network information table for the actual network and the other network are stored in an alternating manner in the FIFO memory,
   wherein the network information table indicates the physical information of its network in the second transmission path and is distinguished by a unique table ID,
   wherein the network information table is segmented into a plurality of sections with a same format, each section having a second indicator and a last section indicator;
   wherein the modulation means further includes a network information replacement means for replacing network information extracted by the extraction means with network information for the first transmission path,
   wherein the network information replacement means comprises:
      a switching circuit having a first terminal and a second terminal;
      memory means having a first memory section and the second memory section being coupled with the first terminal and the second terminal respectively,
   wherein the network information table for the first transmission path includes a first delivery system descriptor and network information table for the second transmission path includes a second delivery descriptor,
   wherein the first delivery system descriptor length and second delivery system descriptor length are in accordance with a transport stream descriptor length;
   wherein the network information table for the actual network and other network for the first transmission path are alternately stored in the first memory section and the second memory section;
   wherein as network information table for actual network and other network from the FIFO memory of the extraction means is transmitted to the network information replacement means, the switching circuit selectively replaces the network information of actual network and other network of the second transmission path by alternately outputting the corresponding actual and other network information of the first transmission path stored in the first memory section and the second memory section;
   wherein service identifiers of network information that are not retransmitted are deleted and placeholder data that has the same length of the deleted service identifiers is added, the placeholder data being determined according to a specification of the information transmission apparatus, and
   wherein a plurality of service list descriptors are appended to a transport stream identifier in accordance with the length of a said transport stream descriptor for identifying previous transmission.

2. An apparatus according to claim 1, wherein the network information replacement means includes:
   a network information conversion means for converting the network information extracted by the extraction means in compliance with a network to which the network information is to be retransmitted, and,
   wherein the network replacement means replaces network information of the signal extracted by the extraction means with information for the first transmission path, using the network information converted by the network information conversion means as the information for the first transmission path.

3. An apparatus according to claim 2, wherein the first transmission path is a cable television channel, and the second transmission path is a satellite broadcasting channel.

4. An apparatus according to claim 3, wherein extracted network information for the actual network and the other network are converted by the network information conversion means into network information that comply with a network to which the network information are to be retransmitted and the network replacement means replaces the network information of the extracted signal by the extraction means with network information for a cable network, using the network information converted by the network information conversion means as the information for the cable.

5. An information transmission method utilized by an information transmission apparatus for transmitting information through a first transmission path, said method comprising:
   a receiving step of receiving a broadcasting signal from a second transmission path,
   a demodulation step of demodulating the signal received in the receiving step,
   a modulation step for modulating the signal demodulated in the demodulation step,
   wherein when the second transmission path includes services of a plurality of satellites belonging to different networks, the demodulated signal from the second transmission path includes network information of the different networks, including an actual network information table and an other network information table, an extraction step of extracting the actual network information table and other network information table from the demodulated signal, and storing the extracted information in a FIFO memory, wherein the network information table for the actual network and the other network are stored in an alternating manner in the FIFO memory, wherein the network information table indicates the physical information of its network in the second transmission path and is distinguished by a unique table ID, wherein the network information table is segmented into a plurality of sections with a same format, each section having a section indicator and a last section indicator, wherein the modulation step further includes a network information replacement step for replacing network information extracted by the extraction step with network information for the first transmission path, wherein the network information replacement step comprises, a switching step of switching between a first terminal and a second terminal;

a storing step of storing network information of the first transmission path to a first memory section and a second memory section being coupled with the first terminal and the second terminal respectively, wherein network information table for the actual network and other network for the first transmission path are alternately stored in the first memory section and the second memory section, wherein as network information table for actual network and other network from the FIFO memory of the extraction step is transmitted for replacement at the replacement step, the switching step selectively replaces the network information of actual network and other network of the second transmission path by alternately outputting the corresponding actual and other network information of the first transmission path stored in the first memory section and the second memory section, wherein the network information table for the first transmission path includes a first delivery system descriptor and network information table for the second transmission path includes a second delivery descriptor, wherein the first delivery system descriptor length and second delivery system descriptor length are in accordance with a transport stream descriptor length, wherein services identifiers of network information that are not retransmitted are deleted and placeholder data that has the same length of the deleted service identifiers is added, the placeholder data being determined according to a specification of the information transmission apparatus, and wherein a plurality of service list descriptors are appended to a transport stream identifier in accordance with the length of a said transport stream descriptor for identifying a new or previous transmission.

6. A method according to claim 5, wherein the network information replacement step includes:

a network information conversion step of converting the network information extracted by the extraction step in compliance with a network to which the network information is to be retransmitted, and, the network replacement step replaces network information of the signal extracted by the extraction step with information for the first transmission path, using the network information converted by the network information conversion step as the information for the first transmission path.

7. A method according to claim 5, wherein the first transmission path is a cable television channel and the second transmission path is a satellite broadcasting channel.

8. A method according to claim 5, wherein extracted network information for the actual network and the other network are converted by the network information conversion step into network information that complies with a network to which the network information are to be retransmitted and the network replacement step replaces the network information of the extracted signal by the extraction step with network information for a cable network, using the network information converted by the network information conversion step as the information for the cable.

* * * * *